United States Patent [19]

Nagashima et al.

[11] Patent Number: 4,812,920
[45] Date of Patent: Mar. 14, 1989

[54] WIDE BAND VIDEO SIGNAL RECORDING APPARATUS

[75] Inventors: Yoshitake Nagashima; Hisashi Ishikawa, both of Kanagawa; Susumu Kozuki, Tokyo; Katsuji Yoshimura, Kanagawa; Koji Takahashi, Kanagawa; Kenichi Nagasawa, Kanagawa, all of Japan

[73] Assignee: Canon Kabushiki Kaisha, Tokyo, Japan

[21] Appl. No.: 68,959

[22] Filed: Jul. 1, 1987

[30] Foreign Application Priority Data

| Jul. 7, 1986 | [JP] | Japan | 61-159480 |
| Jul. 25, 1986 | [JP] | Japan | 61-174974 |
| Jul. 25, 1986 | [JP] | Japan | 61-174975 |
| Dec. 12, 1986 | [JP] | Japan | 61-297422 |
| Dec. 22, 1986 | [JP] | Japan | 61-305892 |
| Dec. 23, 1986 | [JP] | Japan | 61-306865 |

[51] Int. Cl.$^4$ .......................... G11B 5/02; H04N 9/79
[52] U.S. Cl. .................... 358/310; 358/330; 360/22; 360/23
[58] Field of Search ............ 358/310, 323, 330; 360/22, 23, 32

[56] References Cited

U.S. PATENT DOCUMENTS

| 3,513,266 | 2/1967 | Frost et al. | 360/23 |
| 4,181,822 | 1/1980 | Workman | 360/23 |
| 4,476,498 | 10/1984 | Sheean | 358/330 |

Primary Examiner—L. T. Hix
Assistant Examiner—David M. Gray
Attorney, Agent, or Firm—Robin, Blecker & Daley

[57] ABSTRACT

A wide band video signal recording apparatus is arranged to simultaneously record, on a recording medium, multi-channel video signals which are obtained by frequency modulating a luminance signal included in a wide band video signal; by frequency dividing the frequency modulated luminance signal at different phases thereof to obtain multi-channel luminance signals; and by multiplexing a carrier chrominance signal included in the video signal with the low band of at least one of the multi-channel luminance signals.

28 Claims, 20 Drawing Sheets

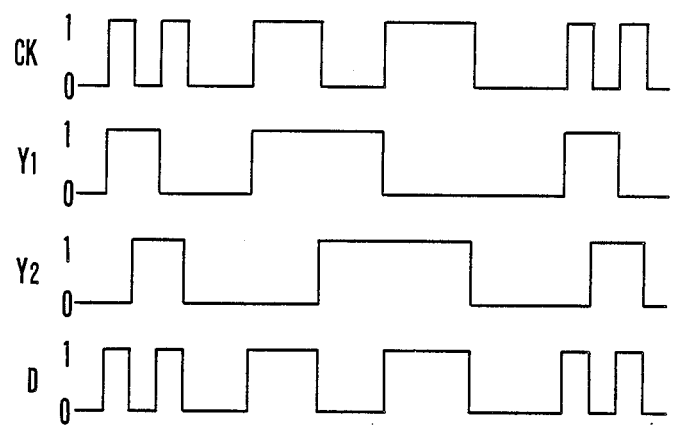

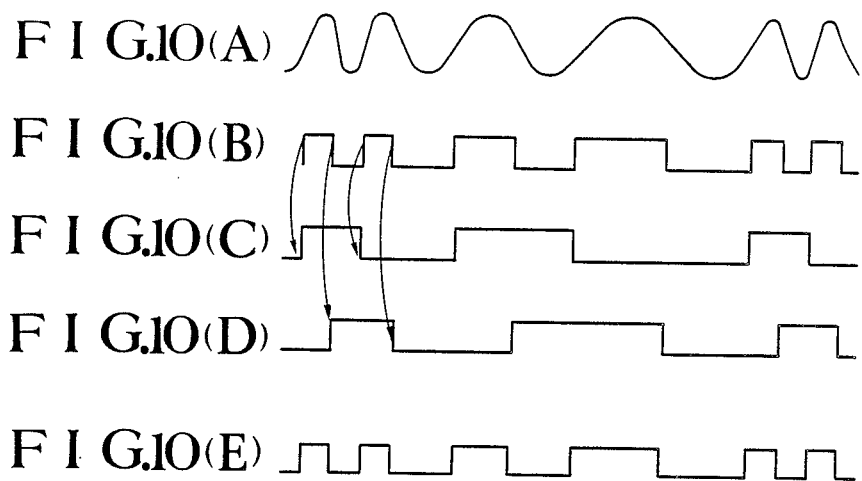
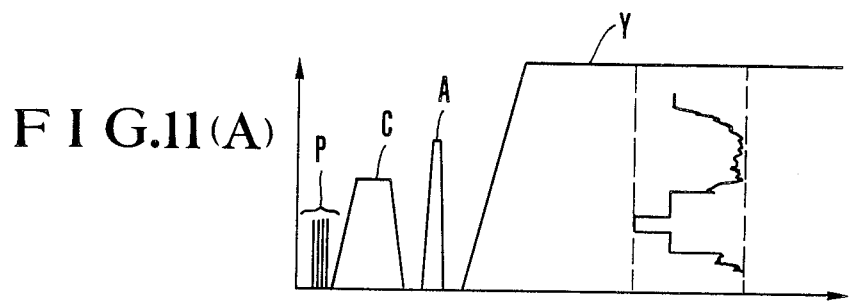
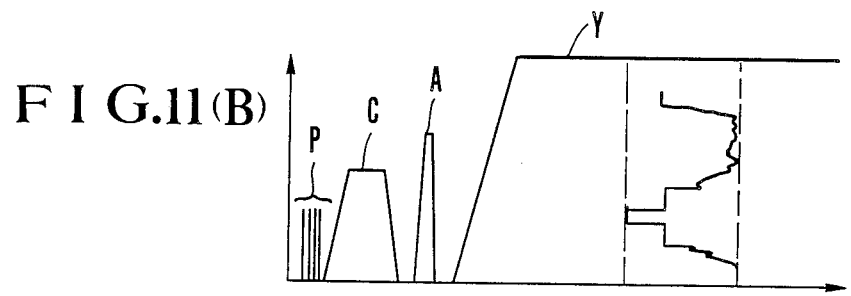

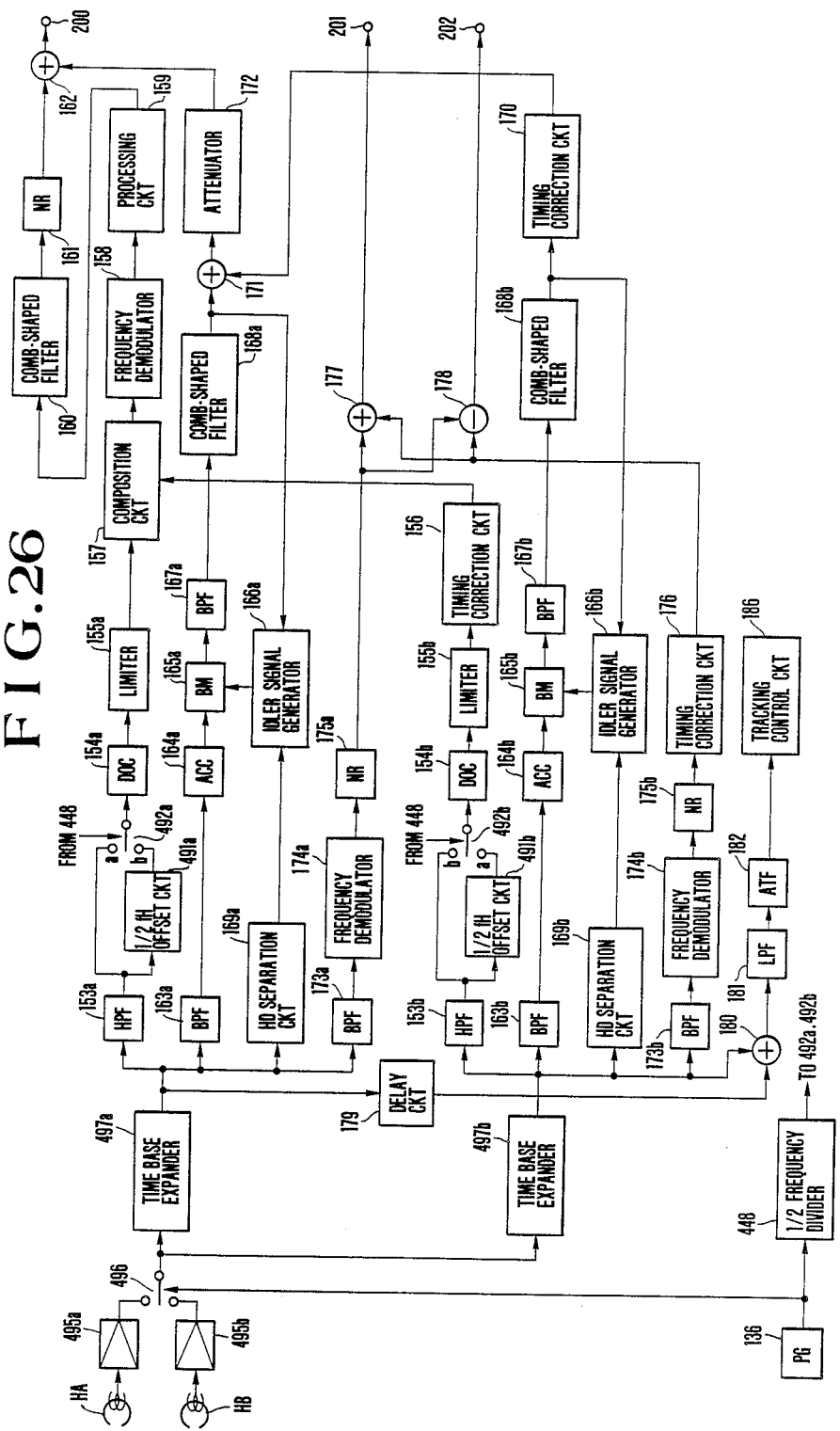

WIDE BAND VIDEO SIGNAL RECORDING APPARATUS

BACKGROUND OF THE INVENTION

1. Field of the Invention:

This invention relates to a wide band video signal recording apparatus and more particularly to an apparatus which is arranged to record a video signal of a wide frequency band in a multi-channelled state.

2. Description of the Related Art:

Varied specifications for high resolution wide band television signals have been proposed during recent years for the purpose of enhancing the quality of reproduced television (TV) signals. These proposed TV signals include, for example, the so-called high definition (hereinafter referred to as HD for short) TV signal which has 1125 scanning lines and a luminance signal band of 20 MHz or thereabout; the so-called extended definition (hereinafter referred to as ED for short) TV signal which has interchangeability with the present TV signal and has a luminance signal band of 8 MHz or thereabout.

For recording and reproduction of such wide band TV signals, the video tape recorders (VTRs) which are currently in use are not usable because of their limited recordable and reproducible frequency band of only 4 MHz or thereabout. To solve this problem, there have been proposed various VTRs which are arranged to record and reproduce the wide band TV in a multi-channel state with the frequency band of each channel limited to 4 MHz or thereabout. A technique of this kind has been disclosed in U.S. patent application Ser. No. 034,212 filed Apr. 3, 1987 which corresponds to Japanese Patent Application No. SHO 61-82932 and is assigned to the assignee of the present invention. However, with a VTR arranged to perform such multi-channel recording, the adverse effects of jitter, etc. must be accurately removed although a composite video signal can be divided and arranged into a multi-channel state by a simple method of dividing it into bands. To meet this requirement, the circuits of the reproduction system of the VTR must be arranged on a large scale. In case that the video signal is to be divided into a high frequency component and a low frequency component in particular, the time constants of circuits for handling these two components differ from each other. In that case, therefore, it has been extremely difficult to restore them back into the original state of video signal by matching them timewise.

Further, in cases where a composite video signal is arranged to be recorded by separating them into R, G and B components, each of them must be processed into a multi-channel state, because each of them is a wide band signal. In such a case, therefore, it is hardly possible to accomplish high density recording because of a great increase in the number of channels.

Further, it is desirous to have a VTR arranged to be capable of recording an audio signal, or a stereo-audio signal, if possible, at a high relative speed. However, the above stated method has hardly enabled VTRs to perform such audio signal recording.

To solve that problem, varied methods of digitally recording video and audio signals have been proposed. However, these methods result in a further broadened band, which forbids high density recording.

SUMMARY OF THE INVENTION

It is a general object of this invention to solve the above stated problems of the prior art.

It is a more specific object of this invention to provide a video signal recording apparatus which is capable of adequately recording a wide-band color video signal with high density and in a multi-track state.

It is another object of this invention to provide a video signal recording apparatus which is capable of recording a wide band video signal without deteriorating the carrier chrominance signal included therein.

Under these objects, a video signal recording apparatus arranged according to this invention as an embodiment thereof comprises: separating means for separating a luminance signal and a carrier chrominance signal respectively from an incoming video signal; modulating means for angle modulating the luminance signal separated by the separating means; channel dividing means arranged to form first and second recording luminance signals by frequency dividing at different phases the angle modulated luminance signal modulated by the modulating means; converting means for converting the carrier wave of the carrier chrominance signal separated by the separating means to the low band of the first and second recording luminance signal; multiplexing means arranged to form first and second recording signals by multiplexing the low band converted carrier chrominance signal converted by the converting means with at least one of the first and second recording luminance signals; and recording means for recording the first and second recording signals simultaneously on a recording medium.

It is a further object of this invention to provide a video signal recording apparatus which is capable of recording in a wide frequency band an audio signal along with a wide band video signal.

Under that object, a video signal recording apparatus arranged as another embodiment of this invention comprises: separating means for separating a luminance signalffrom an incoming video signal; modulating means for angle modulating the luminance signal separated by the separating means; channel dividing means arranged to form first and second recording luminance signals by frequency dividing at different phases the angle modulated luminance signal modulated by the modulating means; recording audio signal forming means for forming first and second recording audio signals on the basis of an incoming stereo audio signal; multiplexing means arranged to form first and second recording signals by multiplexing the first and second recording audio signals respectively with the first and second recording luminance signals; and recording means for recording the first and second recording signals simultaneously on a recording medium.

It is a still further object of this invention to provide a video signal reproducing apparatus which is capable of adequately reproducing a wide band video signal recorded in a multi-channel state.

Under that object, an apparatus arranged according to this invention as a further embodiment thereof to reproduce an information signal from a recording medium on which first and second recording signals are recorded including first and second pulse signals obtained by frequency dividing, at different phases, the information signal which is angle modulated comprises: reproducing means for simultaneously reproducing the first and second recording signals; composing means for obtaining a composite pulse signal by composing the first and second pulse signals reproduced by the reproducing means; detecting means for detecting the duty of at lease a part of the composite pulse signal; correcting means for correcting the relative timing of the first and second pulse signals on the basis of the duty detected by the detecting means; and restoring means for restoring the information signal by angle demodulating the composite pulse signal.

The above and other objects and features of this invention will become apparent from the following detailed description of embodiments thereof taken in connection with the accompanying drawings.

BRIEF DESCRIPTION OF THE DRAWINGS

FIG. 2 is a timing chart showing the operation of the recording system of the VTR of FIG. 1. FIG. 3 shows the correlations of converting data recorded in a memory table shown in FIG. 1.

FIGS. 10(A) to 10(E) show the channel divided state of a luminance signal. FIGS. 11(A) and 11(B) show frequency allocation made for the recording signals of different channels.

FIG. 26 is a block diagram showing the arrangement of the reproduction system of the same VTR.

DETAILED DESCRIPTION OF PREFERRED EMBODIMENTS

Figure 1:
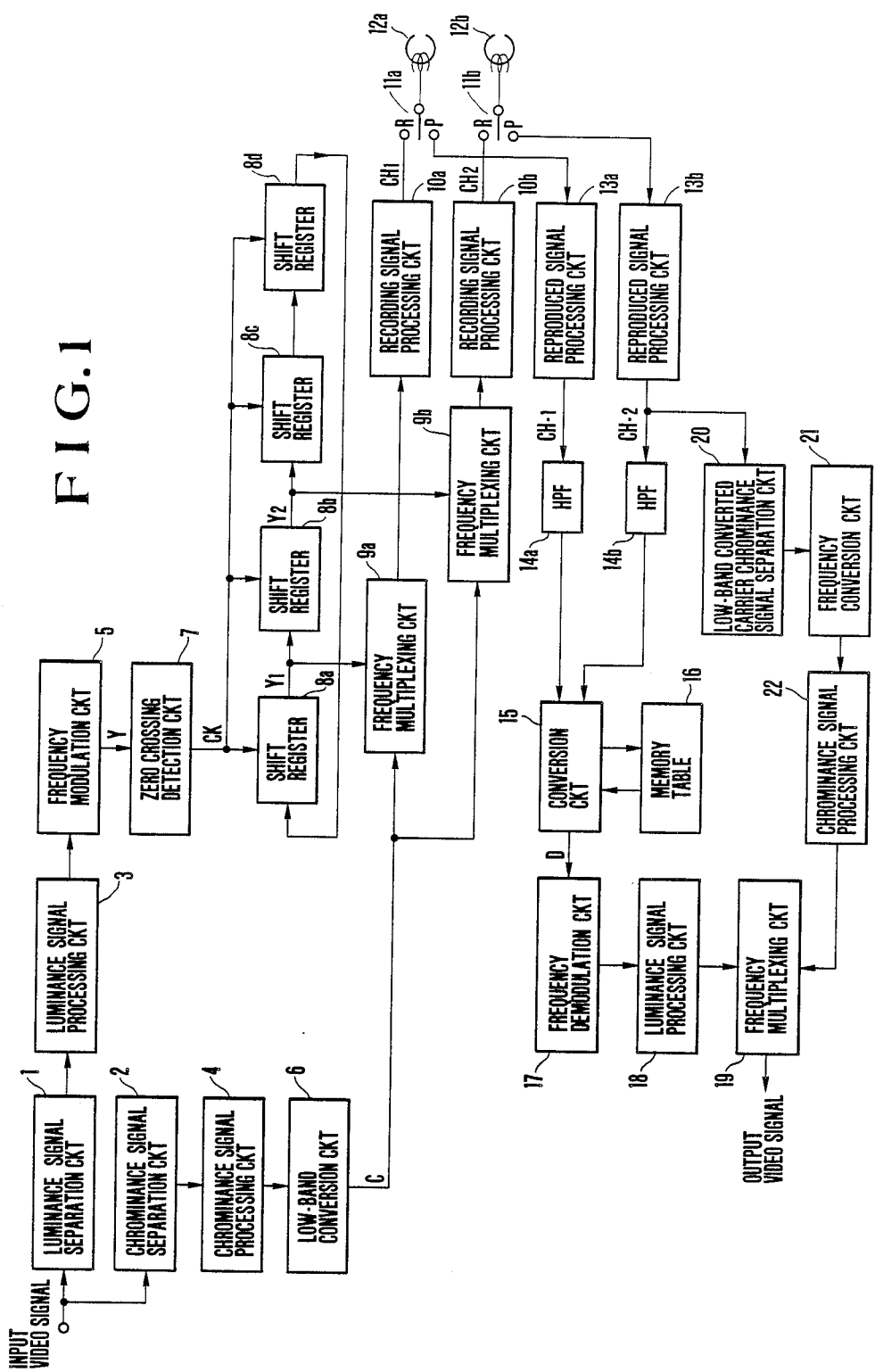
FIG. 1 is a block diagram showing in outline the arrangement of the recording system of a video tape recorder (VTR) arranged according to this invention as an embodiment thereof.

The following describes further details of this invention through embodiments thereof: FIG. 1 shows in outline a video tape recorder (VTR) arranged as an embodiment of this invention. The VTR is assumed to handle an incoming video signal the luminance signal of which is of a frequency band twice as wide as that of the luminance signal handled by the conventional VTR. For illustration's sake, the incoming luminance signal is assumed to be recorded and reproduced by dividing it into two.

Figure 4A:
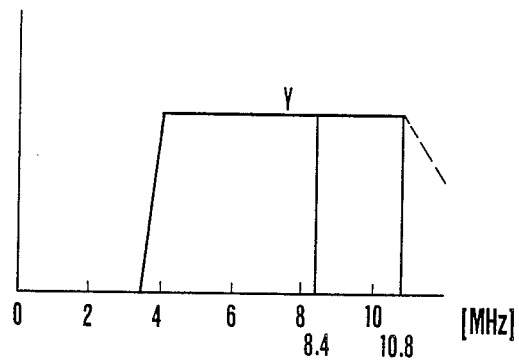
FIGS. 4(A) to 4(C) show the frequency allocation of signals obtained at various parts of FIG. 1.

Referring to FIG. 1, the incoming video signal having the luminance signal of a wide band is supplied to a luminance signal separation circuit 1 and a chrominance signal separation circuit 2 to have the luminance signal and a carrier chrominance signal separated therefrom. The luminance signal separated is supplied to a luminance signal processing circuit 3 while the carrier chrominance signal separated is supplied to a chrominance signal processing circuit 4 to be amplified, corrected, converted to signal forms suited for recording and so on through pretreatment required before recording respectively. The luminance signal thus treated is then frequency modulated by a frequency modulation circuit 5 into a signal of such frequency allocation as shown in FIG. 4(A). The treated carrier chrominance signal is frequency converted from a high band to a low band by a low band conversion circuit 6 and is then produced as a low band converted carrier chrominance signal C.

The luminance signal which is modulated by the frequency modulation circuit 5 is supplied to a zero crossing detection circuit 7 to be compared with a zero level which is employed as a reference value. When the modulated signal comes to cross the zero level, the circuit 7 generates a clock signal CK which changes its signal state either from "0" to "1" or from "1" to "0". The clock signal CK is supplied to shift registers 8a and 8d.

As shown in FIG. 1, the shift registers 8a and 8d form a ring counter of four bits. The shift registers 8a and 8b are initially set at "0" and the shift registers 8c and 8d at "1". The output terminal of the shift register 8d is connected to the input terminal of the shift register 8a. The shift registers 8a to 8d are arranged to be of the edge trigger type.

FIG. 2 is a timing chart showing the operation of the circuits arrangement shown in FIG. 1. When the clock signal CK which is as shown in FIG. 2 is supplied to the shift registers 8a to 8d, the shift registers 8a to 8d respectively detect the edge parts of the clock signal CK. Then, each of them produces a binary signal received at its input terminal and supplies it to the next shift register. Assuming that the output of the shift register 8a is Y1 and that of the shift register 8b is Y2, the wave forms of the outputs Y1 and Y2 are as shown at Y1 and Y2 of FIG. 2.

Figure 4B:
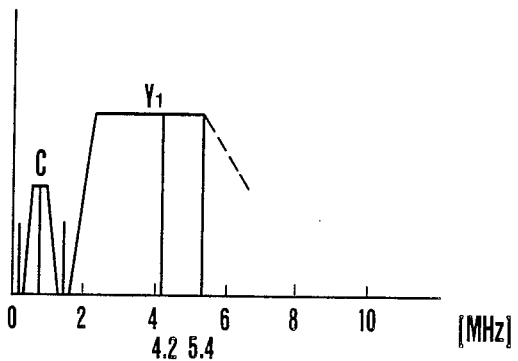
Figure 4C:
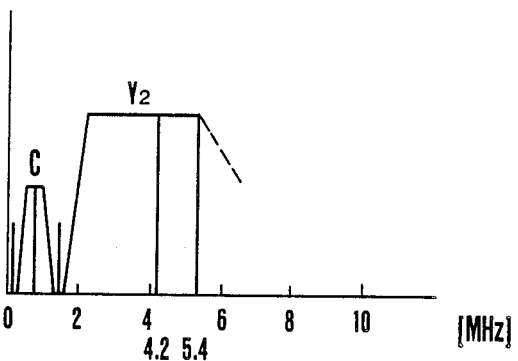

More specifically, the incoming video signal which is frequency modulated carries information within a length portion between adjacent zero crossing points. In the case of this embodiment, the clock signal is generated and has its state inverted at every zero crossing point. Then, the information is divided into two by generating two frequency divided signals corresponding to the rise and fall edges of the clock signal through the ring counter which is composed of the shift registers. As a result, as shown in FIG. 2, the frequency of the signals Y1 and Y2 which are obtained through the shift registers 8a to 8d is lower than that of the clock signal CK corresponding to the information carried by the incoming video signal. As a result, frequency allocation obtains as shown in FIGS. 4(B) and 4(C) and the frequency band thus can be made narrower.

The signals Y1 and Y2 which are thus obtained by narrowing the wide band of the luminance signal included in the incoming video signal are supplied to frequency multiplexing circuits 9a and 9b respectively. The circuits 9a and 9b receive also the low band converted carrier chrominance signal C from the above stated low-band conversion circuit 6. The signal C is frequency multiplexed with each of the signals Y1 and Y2. As a result, the circuits 9a and 9b produces signals of frequency allocation as shown in FIGS. 4(B) and 4(C). The signals thus obtained are supplied to recording signal processing circuits 10a and 10b. Each of the circuits 10a and 10b adds a channel identifying signal for discrimination between the signal including the signal Y1 and the signa including the signal Y2; amplifies the signal; and performs other signal treatment for recording. After that, the recording signal processing circuit 10a produces a recording signal CH1 and the other recording signal processing circuit 10b a recording signal CH2. The recording signals CH1 and CH2 are supplied to the connecting sides R of switches 11a and 11b.

Figure 5:
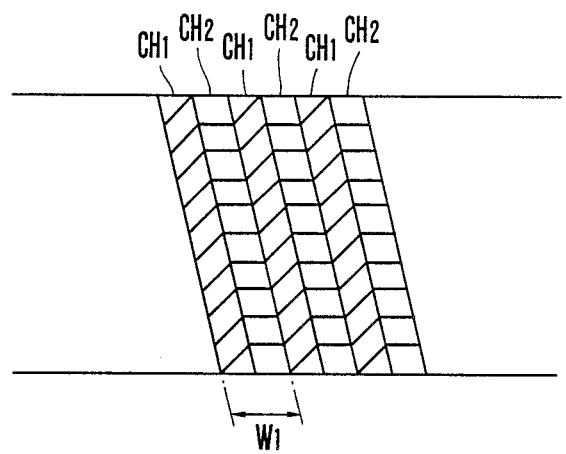
FIG. 5 shows recording tracks formed on a magnetic tape by the VTR of FIG. 1.

In recording, the connecting positions of the switches 11a and 11b are on their sides R. The recording signals CH1 and CH2 which are supplied to these switches are allowed to be simultaneously recorded by magnetic heads 12a and 12b on a magnetic tape which is not shown. The magnetic heads 12a and 12b are arranged in a pair, for example, to have different azimuth angles from each other. The recording signals CH1 and CH2 can be recorded by the heads 12a and 12b in a correlated state as shown in FIG. 5.

In reproducing the recorded signals from the magnetic tape, the recorded signal CH1 is reproduced by the magnetic head 12a and the recorded signal CH2 by the other magnetic head 12b according to the channel identifying signals added during the recording operation. The reproduced signals are supplied to reproduced signal processing circuits 13a and 13b via the switches 11a and 11b which are on their connecting sides P during reproduction. The reproduced signal processing circuits 13a and 13b remove the channel identifying signals and fluctuating components such as jitter, etc. from the reproduced signals CH1 and CH2 and perform other reproduced signal processing actions such as amplification and correction, etc. These circuits 13a and 13b thus produce reproduced signals CH-1 and CH-2. The signal CH-1 corresponds to the signal CH1 and the signal CH-2 to the signal CH2.

The reproduced signals CH-1 and CH-2 obtained from the reproduced signal processing circuits 13a and 13b are supplied to high-pass filters (HPFs) 14a and 14b to have signals Y1 and Y2 separated therefrom. The signals Y1 and Y2 are then supplied to a conversion circuit 15.

The conversion circuit 15 is arranged to restore the clock signal CK to its original state from the reproduced signals CH-1 and CH-2. The circuit 15 detects the high (H) and low (L) levels of the input signals and reads out, according to the combination of the levels, the data of the memory table 16 in which the contents of the correlation table of FIG. 3 are stored. The circuit 15 then produces a restored signal D according to the correlation table of FIG. 3. Further, in case where the signal is to be divided into a small number of signals, the restoring circuit group including the conversion circuit 15 and the memory table 16 may be composed of logical circuits, for example, using an exclusive OR circuit, etc.

The restored signal D which is generated in the above stated manner has the same wave form as the clock signal CK shown in FIG. 2. A reproduced luminance signal is obtainable by demodulating the restored signal D by means of a frequency demodulation circuit 17. The reproduced luminance signal which is produced from the frequency demodulation circuit 17 is converted into the same signal form as the input signal received at the luminance signal processing circuit 18 and is then supplied to a frequency multiplexing circuit 19.

Meanwhile, the reproduced signal CH-2 which is produced from the reproduced signal processing circuit 13b is supplied also to a low-band converted carrier chrominance signal separation circuit 20. At the circuit 20, the low-band converted carrier chrominance signal is separated. The separated low-band converted carrier chrominance signal is converted back into its original frequency at a frequency conversion circuit 21 and is then converted into the same signal form that is obtained when it is received. After that, the signal is supplied as a reproduced carrier chrominance signal to the frequency multiplexing circuit 19.

At the frequency multiplexing circuit 19, the reproduced luminance signal and the reproduced carrier chrominance signal are frequency multiplexed. The circuit 19 then produces a video signal.

Figure 6:
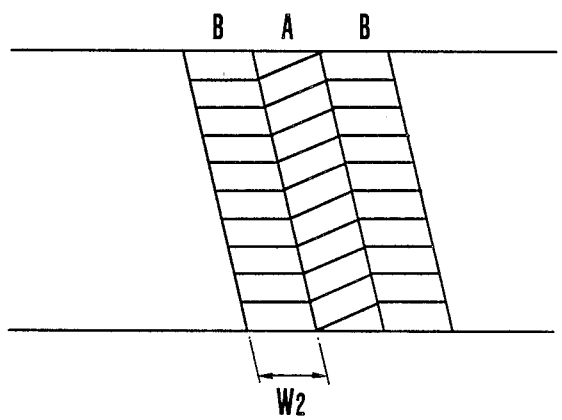
FIG. 6 shows recording tracks formed on a magnetic tape by the conventional VTR.

FIG. 6 shows a helical tracks formed on a magnetic tape by the conventional VTR in relation to the azimuth angle. In FIG. 6, reference symbols shown at the tracks denote the symbols assigned to the magnetic heads by which these tracks are formed. Each of the tracks as shown in FIG. 6 has a width W2 and is formed by changing the use of two magnetic heads A and B from one head over to the other for every field period. In the case of this embodiment, therefore, the width of the magnetic heads 12a and 12b is arranged to be the half of the track width W2; and the azimuth angle of the magnetic head 12a is arranged to be the same as that of the head A and the azimuth angle of the head 12b to be the same as that of the head B. This arrangement makes the track width W1 which covers two tracks as shown in FIG. 5 equal to the track width W2 shown in FIG. 6. Therefore, even the record of the magnetic tape recorded as shown in FIG. 5 is reproduced by an ordinary reproducing apparatus having the magnetic heads A and B, a reproduced video signal is obtainable either from the track CH1 or the track CH2. Further, conversely, in case that the record of a magnetic tape recorded as shown in FIG. 6 is to be reproduced by the reproduction system of FIG. 1, a reproduced video signal is obtainable by supplying the outputs of the HPFs 14a and 14b directly to the frequency demodulation circuit 17 without applying them to the conversion circuit 15 and further by supplying both the outputs of the reproduced signal processing circuits 13a and 13b to the low-band converted carrier chrominance signal separation circuit 20. Further, it is also possible to obtain a reproduced video signal by changing the use of magnetic heads 12a and 12b from one over to the other in such a manner as to select one of them having the same azimuth angle and that of the track being traced for every field period and, further, by supplying the signals reproduced and separated by the HPFs 14a and 14b directly to the frequency demodulation circuit 17 without applying them to the conversion circuit 15. In this case, a reproduced picture is obtainable with high quality because the amount of cross-talk between the magnetic heads can be lessened.

As described in the foregoing, this embodiment is capable of stably recording and reproducing. without deterioration, a wide-band color video signal with simple structural arrangement. Besides, the embodiment ensures adequate interchangeability with the conventional reproducing apparatus and with magnetic tapes recorded by the conventional recording apparatus.

While, in the case of this embodiment, the invention is applied to a VTR arranged to record the wide-band color video signal by dividing it into two narrow-band signals, the signal dividing number can be changed from two to a 2n number by arranging 2n shift registers to give a ring counter of 2n bits and by changing the conversion circuit 15 to receive n number of different outputs. With the dividing number thus increased, the VTR can record a signal of a wider frequency band.

Further, in the embodiment, the luminance signal is frequency modulated before dividing it into channels. However, the invention is applicable also to a signal undergone some other angle modulation process such as phase modulation. In the case of the frequency modulation, the S/N ratio can be improved by increasing the degree of frequency modulation. In the embodiment, the wide-band luminance signal is divided into narrow-band signals and each of the narrow-band luminance signals is frequency multiplexed, before recording, with the low-band converted chrominance signal. However, a color video signal is reproducible even if only one of the divided narrow-band luminance signals is multiplexed instead of both of them.

Figure 7:
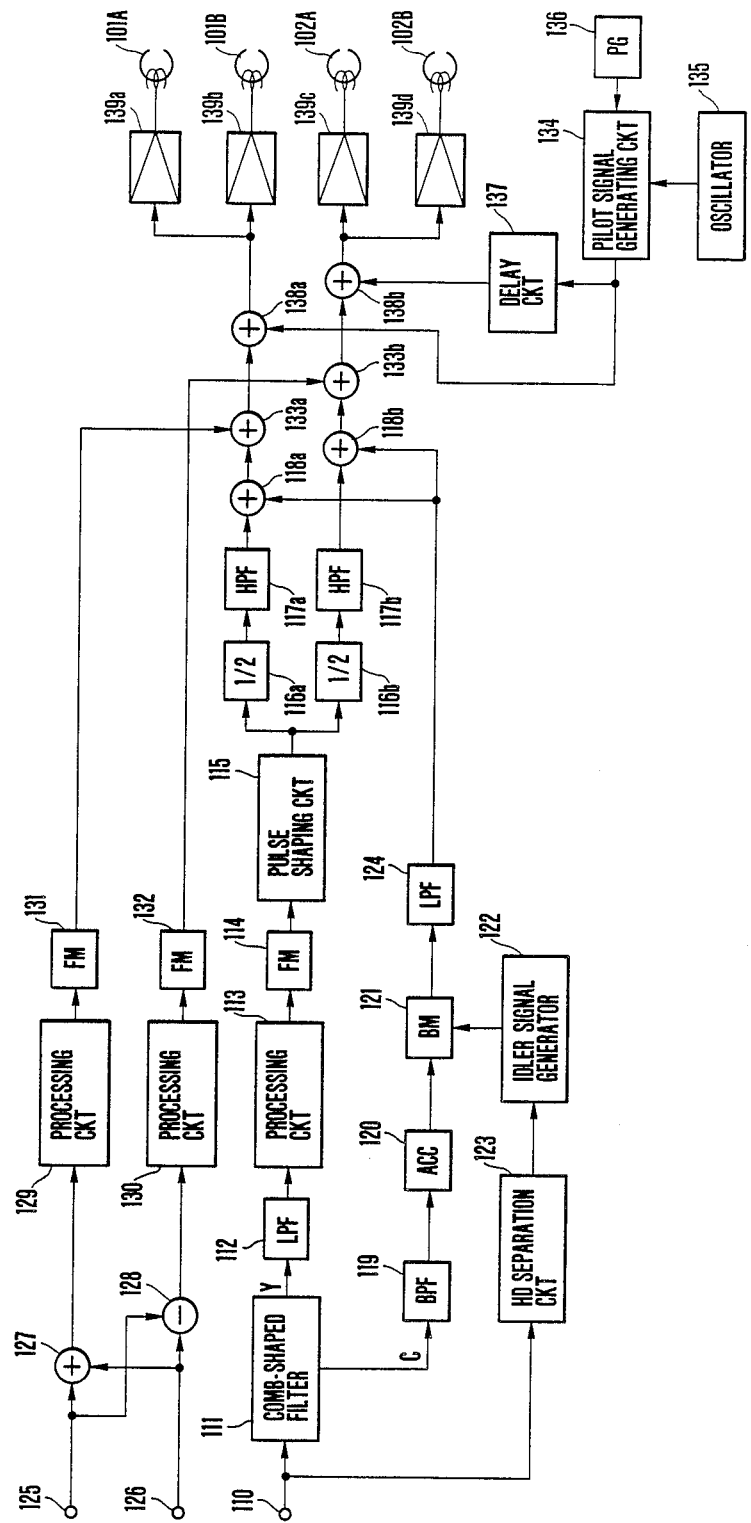
FIG. 7 is a block diagram showing the recording system of a VTR arranged as another embodiment of this invention.
Figure 8A:
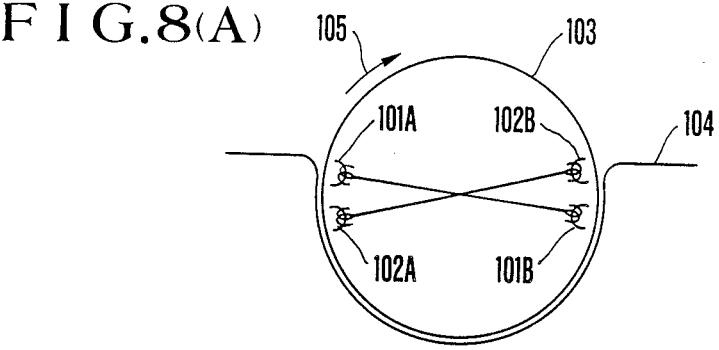
FIGS. 8(A) and 8(B) show the head arrangement of the VTR of FIG. 7.
Figure 8B:
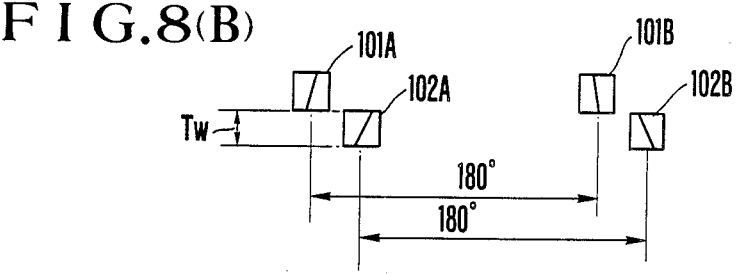

Another embodiment of this invention is arranged as follows: The following description is on the assumption that an incoming video signal is a signal of the NTSC color system including a luminance signal band of about 8 MHz. FIG. 7 shows in a block diagram the recording system of a VTR arranged as this embodiment. FIGS. 8(A) and 8(B) show the head arrangement of the VTR of FIG. 7.

In the VTR of this embodiment, the luminance signal is frequency modulated about twice as much as the conventional modulated frequency. For example, the sink tip part of the luminance signal is modulated to 8.4 MHz and the white peak part to 10.8 MHz. A signal is formed to be inverted in synchronism with the rise of the modulated signal and another signal to be inverted in synchronism with the fall thereof. These signals are thus arranged to be the luminance signals of two channels. Each of the two channel luminance signals is multiplexed with a low-band converted carrier chrominance signal. In addition to that, a sum signal obtained from the L and R channels of a stereo audio signal is superimposed on one of the two channels while a difference signal of the stereo audio signal channels is superimposed on the other channel. Each of the sum and difference signals of the stereo audio signal channels is superimposed to have its band interposed in between the luminance and chrominance signals. The recording signals of two channels thus obtained are arranged to be simultaneously recorded.

Referring to FIGS. 8(A) and 8(B), heads 101A and 101B are arranged to record the recording signal of a first channel. Heads 102A and 102B are arranged to record the recording signal of a second channel. The heads 101A and 101B are arranged to revolve at a speed of 30 revolutions per second at a phase difference of 180 degrees from each other. The heads 102A and 102B which are disposed close to these heads 101A and 101B respectively are arranged to revolve also at a phase difference of 180 degrees from each other. The azimuth angles of these heads 101A, 101B, 102A and 102B are assumed to be $+10°$, $-10°$, $+30°$ and $-30°$ respectively. These four heads are secured to a rotary cylinder 103 as shown in FIG. 8(A). A magnetic tape 104 is wrapped at least 180 degrees round the rotary cylinder 103. The cylinder 103 is arranged to rotate in the direction of arrow 105. As shown in FIG. 8(B), the heads 101A and 101B are positioned on the cylinder 103 at a predetermined stepwise difference TW from the heads 102A and 102B respectively. This stepwise difference TW approximately coincides with the pitch at which tracks are to be formed on the tape.

Figure 9:
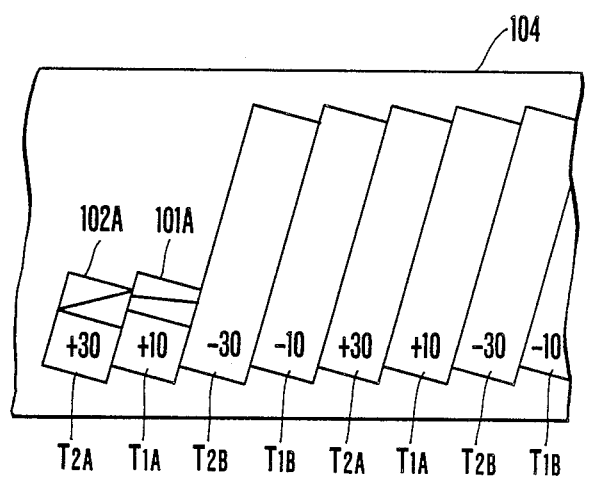
FIG. 9 shows recording pattern obtained on a magnetic tape by the VTR of FIG. 7.

FIG. 9 shows a recording pattern obtained on the magnetic tape when recording is performed with the heads of FIG. 8. As shown, two tracks are simultaneously formed. Tracks T1A and T1B in which the first channel signal is to be recorded and the tracks T2A and T2B in which the second channel signal is to be recorded are alternately formed. As for the azimuth angle, the azimuth angle difference between adjacent tracks are arranged to be at least 20° as indicated in the drawing. This difference in azimuth angle between the adjacent tracks prevents a cross-talk from occurring during reproduction. A capstan, etc. which are not shown are arranged to cause the magnetic tape 104 to travel a distance corresponding to 2 TW while each head revolves 180 degree (1/60 sec).

The details of the recording signal to be supplied to each of the heads are as follows: Referring to FIG. 7, an input terminal 110 is arranged to receive a composite NTSC signal. The signal received is supplied to a comb-shaped filter 111, which divides the signal into a luminance signal Y and a carrier chrominance signal C. The luminance signal Y is supplied to an LPF 112 to have its high zone component cut there. The signal Y is then supplied to a luminance signal processing circuit 113 which consists of various known circuit elements including a clamp circuit, a clipping circuit, a pre-emphasis circuit, etc. After completion of the processing operation of the circuit 113, the luminance signal is supplied to a frequency modulator 114. At the frequency modulator 114, the luminance signal Y is frequency modulated to a degree twice as much as the conventional modulated frequency (for example, the sink tip part is modulated to 8.4 MHz and the white peak part to 10.8 MHz).

The frequency modulated luminance signal is supplied to a pulse shaping circuit 115 to be changed into a pulse-like shape. The output of the circuit 115 is supplied to $\frac{1}{2}$ frequency dividers 116a and 116b. The $\frac{1}{2}$ frequency divider 116a performs $\frac{1}{2}$ frequency division by inverting the high level (Hi) and the low level (lo) of the pulse output of the pulse shaping circuit 115 at the rise edge of the pulse output. The $\frac{1}{2}$ $\frac{1}{2}$ frequency divider 116b performs $\frac{1}{2}$ frequency division by inverting the Hi and the Lo at the fall edge of the pulse output of the circuit 115. In other words, the ½ frequency divider 116a keeps the timing of the rise edge of the pulse related to the frequency modulation while the other ½ frequency divider 116b keeps the timing of the fall edge of the pulse. FIGS. 10(A) to 10(D) show this operation. FIG. 10(A) shows the output of the frequency modulator 114. FIG. 10(B) shows the output of the pulse shaping circuit 115. FIG. 10(C) shows the output of the ½ frequency divider 116a. FIG. 10(D) shows the output of the ½ frequency divider 116b.

The frequency divided signals (the luminance signals of the first and second channels) which are thus obtained are supplied to HPFs 117a and 117b. The band components of these signals for the low-band converted chrominance signal and the frequency modulated audio signal which will be described later are thus attenuated through the HPFs. The outputs of the HPFs are supplied to adders 118a and 118b respectively.

Meanwhile, the chrominance signal which is separated by the comb-shaped filter 111 is supplied to a BPF 119 to have its band limited there. The chrominance signal is then supplied to an known ACC circuit 120 to have its level adjusted before it is supplied to a balanced modulator (hereinafter referred to as BM) 121. The BM 121 converts the carrier frequency of the chrominance signal to a low frequency of, say, 743 KHz on the basis of an idler signal supplied from an idler signal generator 122. The frequency of the idler signal is determined on the basis of a horizontal synchronizing signal (hereinafter referred to as HD) which is separated by a horizontal synchronizing signal (HD) separation circuit 123 in a well known manner. Further, for the purpose of removing a cross-talk component of the chrominance signal of an adjoining field during a reproducing operation, the frequency of this idler signal is arranged to vary to a degree of ½ horizontal scanning frequency (fH) every 1/60 sec. Therefore, the frequency of the carrier wave of the chrominance signal to be recorded shifts by ½ fH at every two tracks. The output of the BM 121 is supplied to an LPF 124. The LPF 124 allows only the lower side-band component of the output of the BM 121 to pass there as a low-band converted chrominance signal. The low-band converted chrominance signal is then supplied to the adders 118a and 118b. An L channel audio signal coming via an input terminal 125 and an R channel audio signal coming via a terminal 126 are respectively supplied to an adder 127 and a subtracter 128. The adder 127 produces a sum signal (L+R) of two channels. The subtracter 128 produces a difference signal (L−R) of the two channel. These signal are subjected to an emphasizing process, a logarithmic compression process, etc. at signal processing circuits 129 and 130. The processed signals are supplied to frequency modulators 131 and 132. The modulators 131 and 132 produce frequency modulated audio signals, which are then added to first and second channel signals at the adders 133a and 133b respectively.

A pilot signal generating circuit 134 is arranged to generate pilot signals for tracking control which is to be accomplished by the known four frequency method. The circuit 134 produces one after another four different pilot signals by frequency dividing an oscillation signal from an oscillator 135 at four different frequency dividing rates. The frequency dividing rates are changed from one over to another at the timing determined on the basis of a rectangular wave signal (hereinafter referred to as signal PG) of 30 Hz which is obtained by detecting the revolving phases of the heads.

The signal PG is produced from a PG generator 136. The pilot signals which are thus obtained are supplied to adders 138a and 138b to be added to the first and second channel signals. In this instance, the pilot signals are added to the second channel signal after they are delayed by a delay circuit 137 as much as the degree of delay of the revolving phase of the heads 102A and 102B relative to that of the heads 101A and 101B. The frequency allocation of the first and second channel recording signals thus obtained from the adders 138a and 138b is as shown in FIGS. 11(A) and 11(B). Since the frequency allocation for each of these channels is exactly the same as the conventional VTR, these signals are of course recordable. In FIGS. 11(A) and 11(B), a reference symbol Y denotes the luminance signal; a symbol C the chrominance signal; a symbol A the audio signal; and a symbol P a pilot signal component.

The recording signals of the first and second channels are respectively supplied to the heads 101A, 101B, 102A and 102B via recording amplifiers 139a, 139b, 139c and 139d. The signal of the first channel is recorded by the heads 101A and 101B on a magnetic tape 104 as shown in FIG. 9 and the signal of the second channel by the heads 102A and 102B. One of the four different pilot signals is thus recorded in every two tracks one after another.

Figure 12:
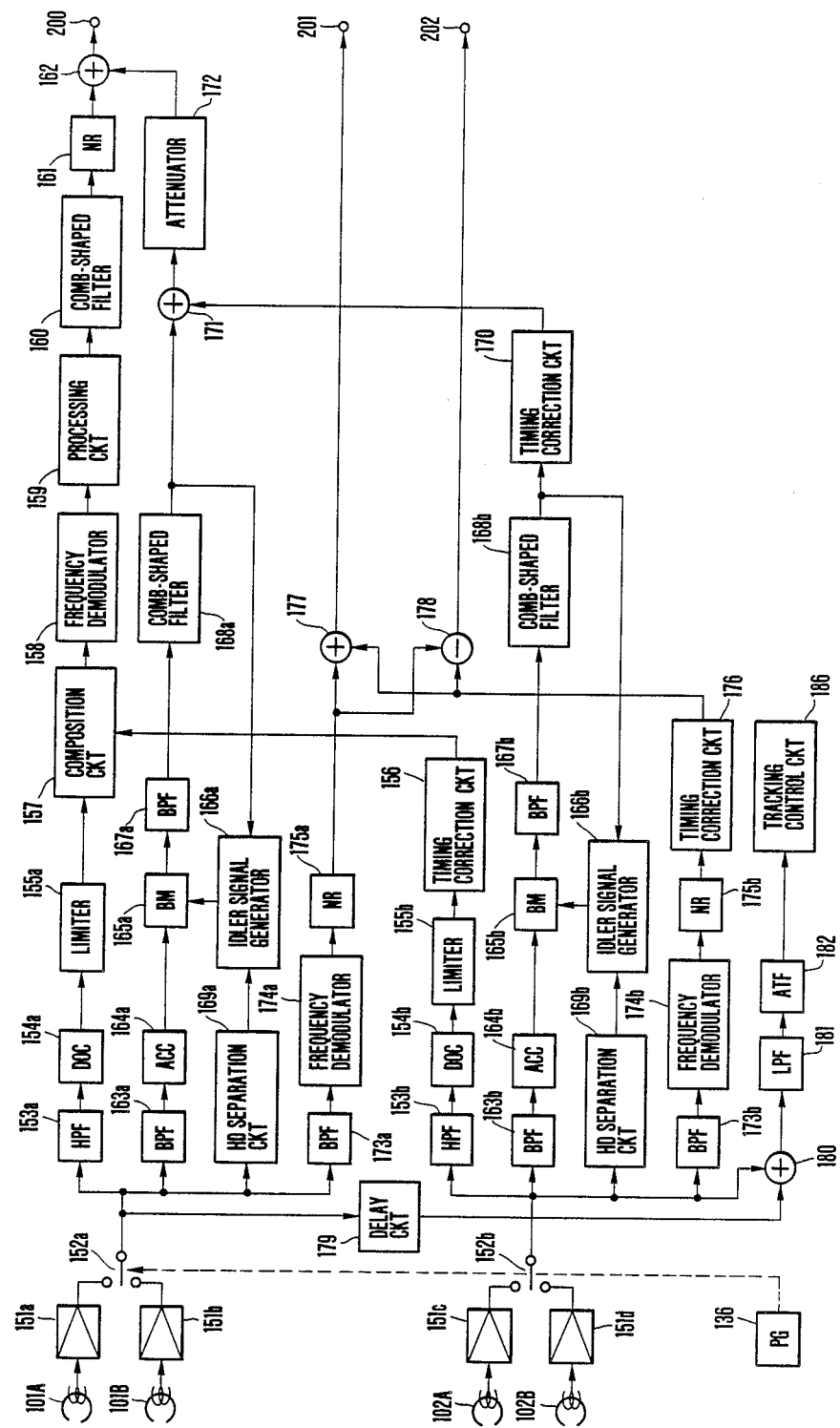
FIG. 12 is a block diagram showing by way of example the reproduction system of the VTR which has the recording system thereof arranged as shown in FIG. 7.

FIG. 12 shows the arrangement of the reproduction system of the VTR of this embodiment. During a reproducing operation, the heads 101A, 101B, 102A and 102B trace the tracks T1A, T1B, T2A and T2B respectively.

The signal of the first channel which is reproduced by the heads 101A and 101B is amplified by head amplifiers 151a and 151b. Then, a switch 152a which operates under the control of the signal PG generated by the above stated PG generator 136 produces signals which are obtained while these heads are tracing the tracks in the form of a continuous signal. The continuous signal produced from the switch 152a is supplied to an HPF 153a. The HPF 153a then separates only the luminance signal of the first channel included in the reproduced signal. The output of the HPF 153a is supplied to a dropout compensation (DOC) circuit 154a. When any drop-out occurs in the reproduced signal, the DOC circuit 154a replaces the dro--out part with a signal part obtained one horizontal scanning period before the drop-out part. The luminance signal of the first channel which comes from the circuit 154a is supplied to a limiter 155a to have level fluctuations thereof removed there and is thus formed into a pulse-like shape.

Meanwhile, the signal of the second channel which is reproduced by the heads 102A and 102B is amplified by head amplifiers 151c and 151d, in the same manner as the first channel signal, and is then formed into the form of a continuous signal by a switch 152b. The output of the switch 152b is also transformed into a pulse-shaped luminance signal of the second channel through an HPF 153b, a DOC circuit 154b and a limiter 155b. A timing correction circuit 156 is arranged to correct a positional deviation of the heads from their position obtained during recording. The circuit 156 performs this function by correcting or adjusting the timing of producing the luminance signal of the second channel therefrom.

The pulse-shaped luminance signals of the first and second channels thus obtained are supplied to a composition circuit 157. The circuit 157 then produces a pulse-shaped frequency modulated luminance signal relative to the original wide band luminance signal. This composition circuit 157, for example, consists of an exclusive OR (EXOR) circuit, etc. and produces an output which is as shown in FIG. 10(E).

The frequency modulated luminance signal composed by the circuit 157 is demodulated by a frequency demodulator 158. The output of the demodulator 158 is brought back into the original luminance signal by a signal processing circuit 159 which includes, among other, a deemphasis circuit. A comb-shaped filter 160 is arranged to remove a frequency component (An odd number times as high as ½ or thereabout) of a chrominance signal which is to be added during an ensuing treating process. The output of the filter 160 is supplied to an adder 162 after its noise component is suppressed at a noise reduction (NR) circuit 161.

A chrominance signal is separated at a BPF 163a from the output signal of the switch 152a. The chrominance signal thus separated is supplied to an ACC circuit 164a to have its reproduction level corrected there. After that, the chrominance signal is supplied to a BM 165a to be brought back to its original frequency band there on the basis of an idler signal generated by an idler signal generator 166a. The output of the BM 165a is supplied to a BPF 167a to have an unnecessary frequency component removed there. The output of the BPF 167a is supplied to a comb-shaped filter 168a. The comb-shaped filter 168a has a characteristic opposite to that of the comb-shaped filter 160 and allows a component of a frequency approximately an odd number times as high as ½ fH to pass there. The filter 168a is thus arranged to eliminate the leak components of the luminance signal and audio signal components and a crosstalk of the chrominance signals of adjoining tracks. In other words, since the carrier frequency of the reproduced chrominance signal shifts by ½ fH at every field, the frequency of the idler signal generated by the idler signal generator 166a is arranged to have its frequency shift as much as ½ fH for every field in such a manner as to bring the carrier frequency back to its original frequency. As a result of this, the chrominance signal component of an adjoining field has a frequency component which is shifted by ½ fH (near to a value an integer times as much as fH). Therefore, this is arranged to be removed by the comb-shaped filter 168a.

Further, the idler signal generator 166a generates an idler signal including a jitter brought about by the recording and reproduction system on the basis of the reproduced HD signal separated by the HD separation circuit 169a and a color burst signal included in the chrominance signal which is produced from the comb-shaped filter 168a. Therefore, the jitters are removed from the chrominance signal before it is produced from the BM 165a.

Meanwhile, the chrominance signal which is separated by the BPF 163b from the output signal of the switch 152b is likewise processed. Then, a comb-shaped filter 168b produces a chrominance signal which is free from jitter and noise. A timing correction circuit 170 makes the timing of the chrominance signal reproduced from the first cannel and that of the chrominance signal reproduced from the second channel coincide with each other. The chrominance signals are then supplied to an adder 171 to be added together. The chrominance signal thus obtained is supplied to an attenuator 172 to be attenuated to one half thereof. The attenuated chrominance signal is supplied to another adder 162 to be added together with the reproduced luminance signal. The adder 162 thus produced a reproduced wide-band NTSC signal.

Further, the frequency modulated audio signal (a sum signal) separated from the output of the switch 152a by a BPF 173a is frequency demodulated by a frequency demodulator 174a and is then supplied to a noise reduction (NR) circuit 175a. The circuit 175a then removes noises from the audio signal in the same manner as the above stated emphasizing and logarithmic compression processes and thus produces a reproduced sum signal (L+R). Meanwhile, the frequency modulated audio signal (a difference signal) which is separated likewise from the output of the switch 152b by a BPF 173b is demodulated by a frequency demodulator 174b. Then, a reproduced difference signal (L−R) is obtained through a noise reduction circuit 175b. The reproduced difference signal (L−R) is supplied to a timing correction circuit 176 to have its timing adjusted to coincide with that of the reproduced sum signal (L+R). These signals are supplied to an adder 177 and a subtracter 178 to obtain reproduced audio signals of the L and R channels respectively.

While the reproduced wide-band NTSC signal is produced from an output terminal 200, the reproduced audio signals of the L and R channels are produced from output terminals 201 and 202 respectively.

The signal produced from the switch 152a is delayed for a period of time corresponding to a difference between the tracing timing of the heads 101A and 101B and that of the heads 102A and 102B. The delayed output signal is supplied to an adder 180 to be added together with the signal produced from the switch 152b. The output of the adder 180 is supplied to an LPF 181 to separate the pilot signal component thereof. The output of the LPF 181 is supplied to a tracking control signal generating circuit (hereinafter referred to as ATF circuit) 182. The ATF circuit 182 then produces a tracking error signal which is obtained through a known four-frequency process performed with two adjacent tracks handled as one unit. A tracking control circuit 186 controls on the basis of this tracking error signal a capstan, etc. which are not shown. The travel of the magnetic tape 104 is thus controlled for accurate tracing actions of the heads.

It has been ascertained through experiments that a VTR arranged in the manner as described above is capable of recording and reproducing a wide-band NTSC signal together with a stereo audio signal without lowering recording density despite of its simple structural arrangement. Further, it permits reproduction of a video signal by reproducing only one of the channels although the video signal thus obtained is of a narrow band. If this one channel is the first channel, a monoral audio signal can be reproduced. In other words, the signal recorded by the VTR of this embodiment is reproducible by a VTR of, for example, the conventional two-head type. The embodiment thus has the so-called interchangeability with the conventional VTRs.

Further, while the embodiment is arranged to have the chrominance signal superimposed on the recording signals of both the first and second channels. This arrangement may be changed to have the chrominance signal superimposed on only any one of the recording signals.

While the frequency modulated audio signal and the video signal are arranged to be frequency multiplexed, this arrangement may be changed to record them in one and the same track by recording the frequency modulated audio signal on a deeper layer of the magnetic recording medium and the video signal on a surface layer thereof.

Further, with regard to the method for accomplishing tracking control, the above stated four-frequency method may be replaced with some other method. For example, a control signal relative to the track pitch may be recorded along the edge of the tape and the tracking control may be accomplished by reproducing this control signal.

Figure 13:
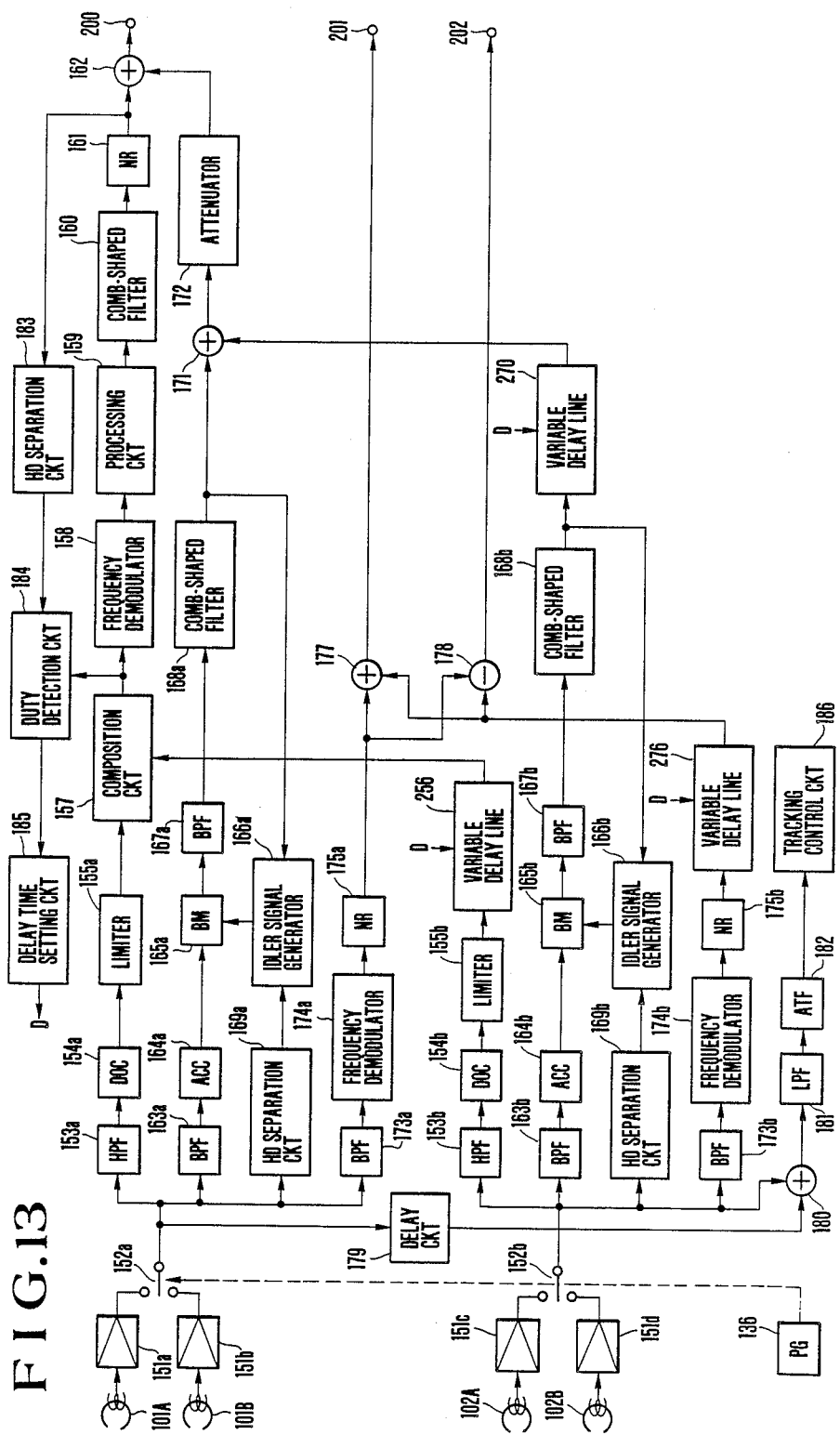
FIG. 13 show another example of the reproduction system of the VTR corresponding to the recording system of FIG. 7.

FIG. 13 shows another example of arrangement of the reproduction system corresponding to the recording system of FIG. 7. In the case of FIG. 13, the illustration of the reproduction system includes specific arrangement for correction of timing between the two channels. The timingcorrection is arranged to be made in the following manner: The parts similar to those shown in FIG. 12 is indicated by the same reference numerals and the details of them are omitted from the description. Referring to FIG. 13, a luminance signal is restored through a noise reduction circuit 161. A horizontal synchronizing signal (HD) is separated from the luminance signal by means of the horizontal synchronizing signal separation circuit 183. Since the frequency of the frequency modulated signal remains constant in the signal portion where no level change takes place in the luminance signal, the duty of the signal produced from a composition circuit 157 must be 50%. Therefore, assuming that the time deviation between the two channels relative to each other is zero at the standard level of the horizontal synchronizing signal, the duty of the composition circuit 157 is 50%.

Further, in case that the output of the heads 101A and 101B is delayed relative to that of the heads 102A and 102B, the duty becomes smaller than 50%. If the output of the heads 101A and 101B gains relative to that of the heads 102A and 102B, the duty becomes larger than 50%. A duty detection circuit 184 is arranged to detect the duty of the signal produced from the composition circuit 157 for a period of time corresponding to the standard level of the horizontal synchronizing signal. Then, in accordance with the output of the circuit 184, a delay time setting circuit 185 generates a delay time setting signal D for determining the delay time of variable delay lines 256, 270 and 276 in such a way as to ensure that the duty of the output signal of the composition circuit 157 is 50% during that period.

The VTR which is arranged as described above is capable of adequately reproducing a wide-band NTSC signal from a magnetic tape on which the wide-band NTSC signal is recorded in two channels with the reproduction carried out by correcting any timing deviation or difference between the two channels.

Figure 14:
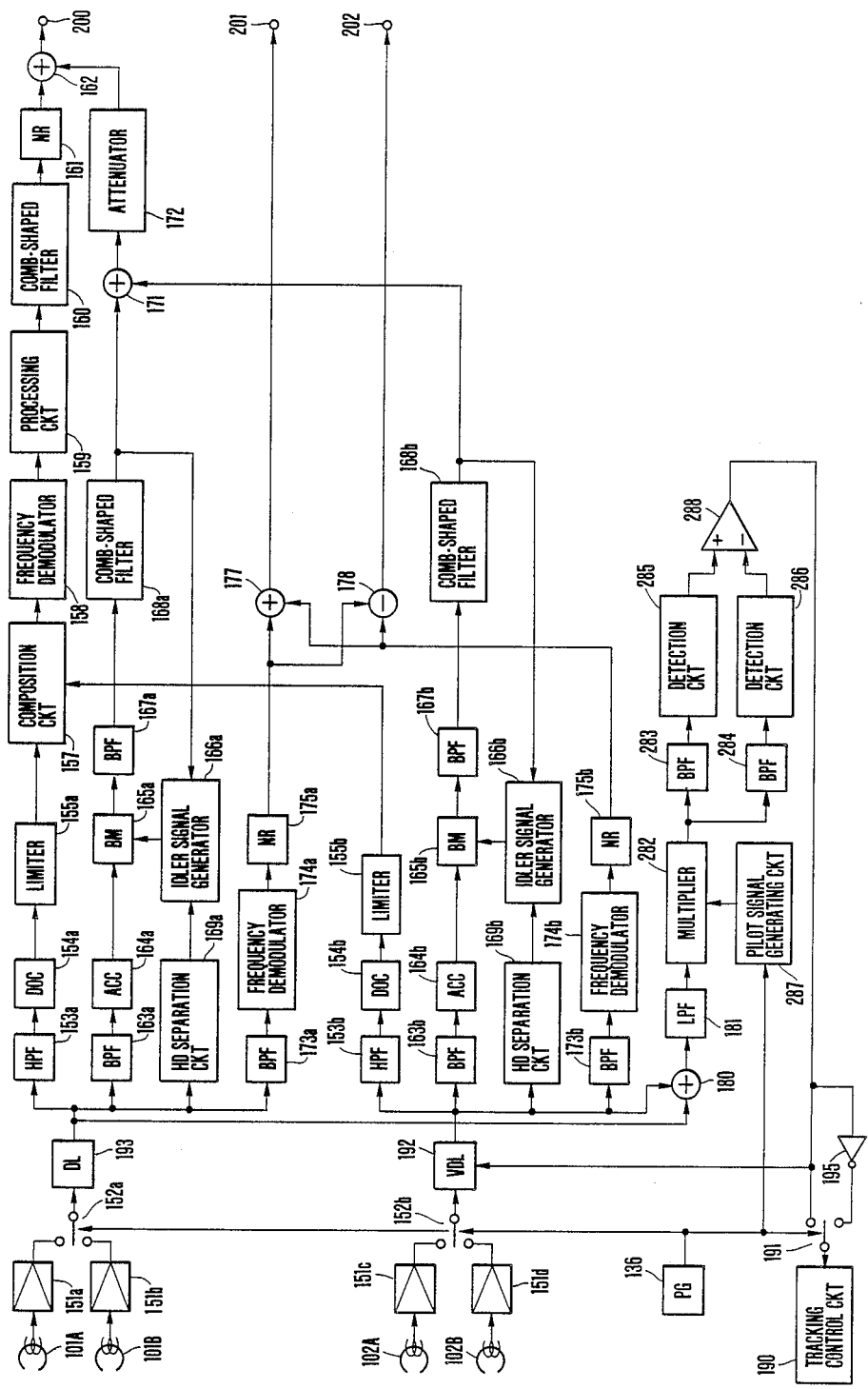
FIG. 14 shows a further example of the reproduction system of the VTR corresponding to the recording system of FIG. 7.
Figure 16:
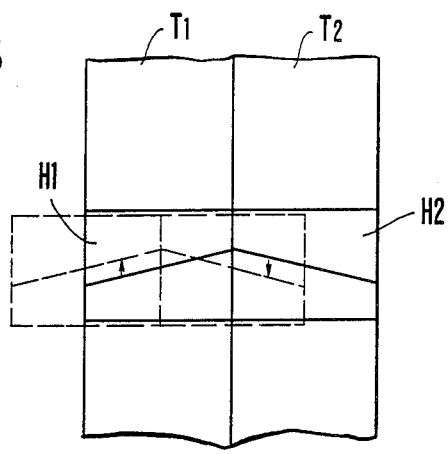
FIG. 16 shows a problem to be encountered in carrying out multi-channel reproduction in accordance with the conentional method.

FIG. 14 shows the arrangement of a further example of the reproduction system corresponding to the recording system of FIG. 7. In the case of FIG. 14, the timing difference between the two channels is arranged to be corrected by another method. The parts similar to those shown in FIG. 12 are indicated by the same reference numerals. Before the description of the timing difference (or deviation) correcting arrangement, one of the causes for the timing deviation is described below with reference to FIG. 16:

The term "azimuth angle" means the inclination of the magnetizing direction relative to the tracing direction of the head. The direction in which the gap of the head extends is not perpendicular to the longitudinal direction of the recording track. Therefore, the tracing position of the head deviates in the direction of width of the track to make a tracking error. The occurrence of the tracking error results in a change in the timing of signal reproduction. FIG. 16 illustrates this. Assuming that a head H1 is accurately tracing a track T1 as indicated by a full line in FIG. 16, the center of the head coincides with the center line of the track. This is called a a just track state. If the head deviates to the left as indicated by a broken line in FIG. 16, the reproducing timing quickens as obvious from the drawing.

The gain (or loss) of the reproduction timing of the head Hl, with the head singly considered, does not present any serious problem as the reproduced signal gains (or loses) as a whole so long as the degree of the tracking deviation (error) is unvarying.

In cases where a reproducing operation is to be performed by simultaneously using two heads of different azimuth angles as shown in FIG. 16, the relative time difference inevitably occurs between the reproduced signals due to the tracking error even if signals simultaneously recorded by two heads are reproduced by the two heads. For example, in reproducing the signals simultaneously with two heads of opposite azimuth angles, like the heads H1 and H2 of FIG. 16, if a tracking error arises, the reproducing timing of one reproduced signal gains while that of the other reproduced signal loses thus resulting in a large difference in reproduction timing. Besides, in the event of imperfect linearity of a recording medium, the degree of the tracking error varies every moment thus causing fluctuations in the reproduction timing difference.

Therefore, adequate reproduction becomes hardly possible even with the wide-band TV signal recorded by the multi-track recording method as mentioned in the foregoing because of difficulty in matching the time bases of the signals reproduced from the multi-channel arrangement.

The reproduction system of the VTR of FIG. 14 is arranged to solves this problem as described below:

Referring to FIG. 14, the VTR includes a variable delay line (hereinafter referred to as VDL) 192 and a fixed delay line (hereinafter referred to as DL) 193. A signal produced from the DL 193 is added together with a signal produced from the VDL 192 at an adder 180. The output of the adder 180 is supplied to an LPF 181 to separate therefrom a pilot signal component. The pilot signal component is supplied to a tracking control signal generating (ATF) circuit which is arranged as follows:

The frequencies f1, f2, f3 and f4 of the four frequency pilot signals are assumed to be in the relation of f2−f1=f3−f4=fA and f3−f2=f4−f1=fB. These pilot signals are assumed to be recorded on a tape in rotation in the order of frequencies f1−f2−f3−f4, one for every field portion, which, in the case of this embodiment, consists of two tracks.

The output of the LPF 181 is supplied to a multiplier 282 to be multiplied by reference pilot signals which are generated by a reference pilot signal generating circuit 287 in rotation in the order of frequencies f1−f2−f3−f4. As well known, components fA and fB included in the output of this multiplier 282 are separated by means of BPFs 283 and 284 respectively. These components fA and fB undergo a level detection process performed at detection circuits 285 and 286. Their detected levels are compared at a differential amplifier 288 to detect thereby the degree of a tracking error.

With the reference pilot signals applied for multiplication in the above stated rotation, a tracking error causes the directions in which the components fA and fB are generated to be inverted for every field. Therefore, the output of the differential amplifier 288 is supplied to an inverting amplifier 289 and the output of the inverting amplifier 289 and the output of differential amplifier 288 are alternately allowed to be produced by a switch which performs the change-over between these outputs under the control of the signal PG. A tracking control signal is obtained in this manner. This tracking control signal is supplied to a tracking control circuit 190. The circuit 190 then controls the travel of the tape in such a way as to allow the heads 101A, 101B, 102A and 102B to trace racks T1A, T1B, T2A and T2B in a just track state.

Figure 15A:
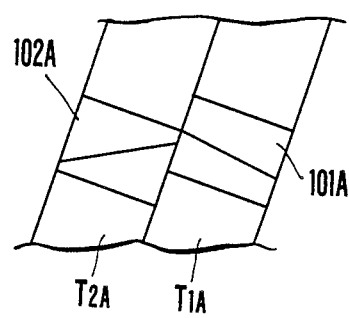
FIGS. 15(A) to 15(F) show tracking errors of the VTR of FIG. 14 in relation to the reproducing timing of each channel.
Figure 15B:
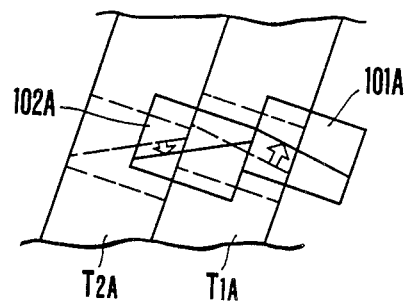
Figure 15C:
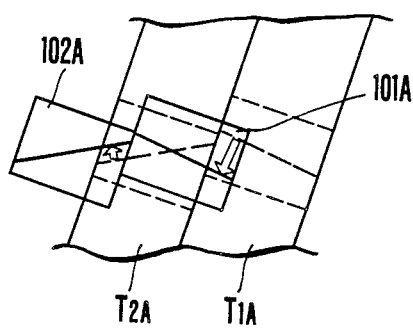
Figure 15D:
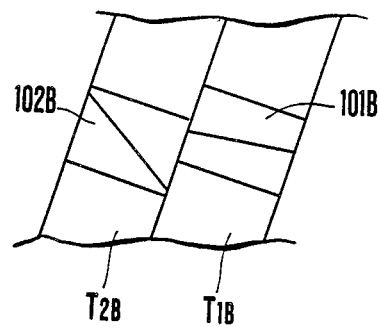
Figure 15E:
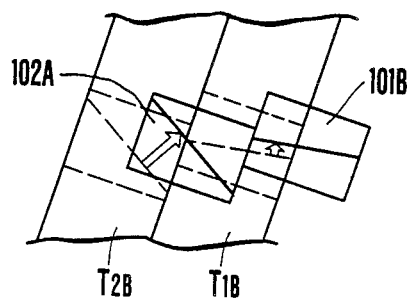
Figure 15F:
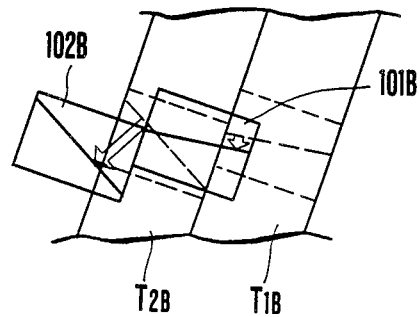

FIGS. 15(A) to 15(F) show the relation of tracking errors to the reproduction timing of two heads which are simultaneously tracing the tracks. FIG. 15(A) shows the heads 101A and 102A as in the just track state. FIG. 15(B) shows the heads 101A and 102A as in a losing tracing state relative to a track pattern. FIG. 15(C) shows the heads 101A and 102A as in a gained tracing position relative to the track pattern. FIG. 15(D) shows the heads 101B and 102B as in the just track state. FIG. 15(E) shows the heads 101B and 102B as in a losing tracing state relative to the track pattern. FIG. 15(F) shows the heads 101B and 102B as in a gained tracing state relative to the track pattern.

As obvious from these drawings, the second channel reproduction timing of the head 102A gains further then that of the head 101A according as the heads 101A and 102A are in a further gained tracing state relative to the track pattern. As to the heads 101B and 102B, the first channel reproduction timing of the head 101B gains further than that of the head 102B according as their gained tracing state becomes greater relative to the track pattern. Accordingly, the relation of the direction of the tracking error to the length of delay time to be effected by the VDL 192 is inverted at every field.

The absolute value of the output of the differential amplifier 288 indicates the degree of the tracking error. The positive or negative value of the output indicates the direction of the tracking error. Since the direction of the tracking error is inverted at every field, the delay time to be effected by the VDL 192 is determined according to the output of the amplifier 288. By this, the reproduced signal of the first channel which is produced from the DL 193 and that of the second channel which is produced from the VDL 192 can be made to perfectly coincide with each other.

In the VTR of the embodiment described above, hhe tracking error is constantly detected and the delay time of the VDL 192 is determined according to the result of tracking error detection. Therefore, the reproduced signals of the first and second channels can be perfectly matched timewise even in the event of imperfect linearity of the recording medium. Therefore, the embodiment is capable of adequately recording and reproducing a wide-band TV signal. Further, the embodiment employs the four frequency method for detecting the tracking errors. However, this invention is likewise applicale to any other apparatus of the kind using a known control signal for detecting tracking errors as long as the recording medium retains an acceptable degree of linearity.

Figure 17:
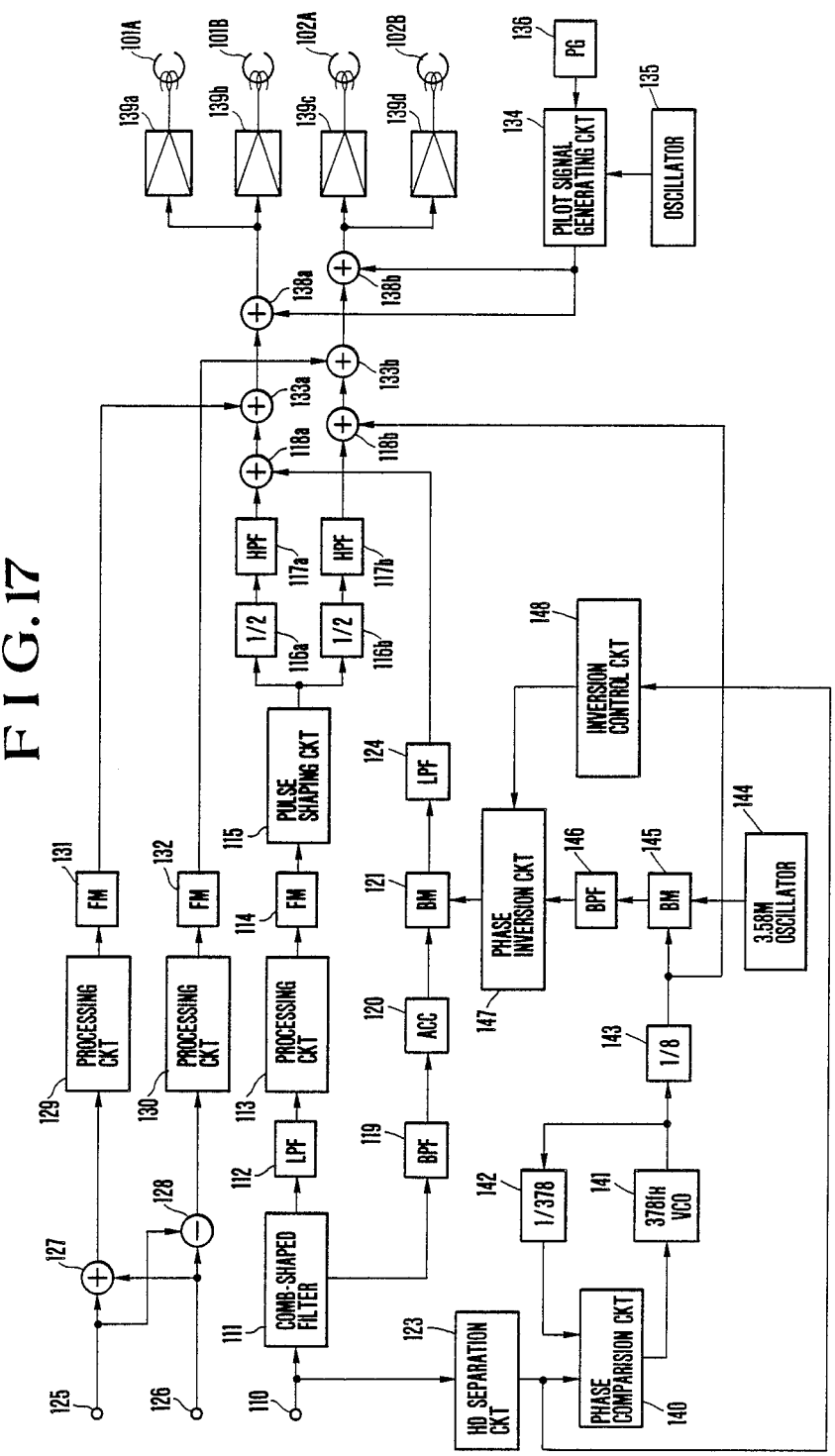
FIG. 17 is a block diagram showing the recording system of a VTR arranged as a further embodiment of this invention.

In a further embodiment of this invention, the VTR of FIG. 7 is modified and arranged to be capable of accurately removing time base fluctuations and particularly those of the chrominance signal. FIG. 17 shows the recording system of the VTR arranged as that embodiment. The parts which are similar to those of FIG. 7 are indicated by the same reference numerals and the details of them are omitted from the following description. A BM 121 is rranged to convert the carrier frequency of the chrominance signal to a lower frequency (to $474\frac{1}{4} * fH \approx 743$ KHz in this case) by means of a frequency converting signal (an idler signal), which is arranged as follows: A horizontal synchronizing (HD) signal separation circuit 123 is arranged to separate a horizontal synchronizing (HD) signal from an NTSC TV signal received via a terminal 110. The signal HD is supplied as one of inputs to a phase comparison circuit 140. The output o the circuit 140 is arranged to control a voltage controlled oscillator (hereinafter referred to as VCO) 141 which has its center frequency at 378 fH. The output of the VCO 141 is frequency divided by a 1/378 frequency dividing circuit 142 to have its frequency changed to fH before it is supplied to the phase comparison circuit 140 as the other input signal thereof. The output of the VCO 141 is supplied also to a $\frac{1}{8}$ frequency divider 143. The $\frac{1}{8}$ frequency divider 143 then produces a reference signal of 47.25 fH which is phase locked to the signal HD. The frequency 47.25 fH is equal to the low-band carrier frequency fSCL of the low-band converted chrominance signal. The output of the frequency divider 143 is supplied to an adder 118b as a reference signal and is added to the luminance signal of the second channel.

A BM 145 is arranged to balance modulate the output signal fSCL of the $\frac{1}{8}$ frequency divider 143 and the output fSC of a quartz crystal oscillator 144 which oscillates at the color subcarrier frequency of the NTSC TV signal (3.58 MHz=fSC). A BPF 146 is arranged to separate a component of fSC+fSL of the output of the BM 145 and to supply it to a phase inversion circuit 147. The phase inversion circuit 147 is arranged to invert the input signal at every horizontal scanning period (H) in response to a signal produced from an inversion control circuit 148. As a result of this, the frequency of the frequency converting signal supplied to the BM 121 is shifted by $\frac{1}{2}$ fH relative to the frequency fSC+fSCL. The carrier frequency of the low-band converted chrominance signal produced from the BM 121 is also shifted $\frac{1}{2}$ fH relative to the frequency fSCL. The low-band converted chrominace signal which is thus obtained at the BM 121 is added by an adder 118a to the luminance signal of the first channel. Then, as shown in FIG. 9, the signals of the first and second channels are recorded in adjacent tracks respectively. The low-band converted chrominance signal multiplexed with the luminance signal of the first channel has its carrier frequency differ as much as $\frac{1}{2}$ fH from the frequency of the reference signal multiplexed with the luminance signal of the second channel. As a result, any cross-talk components of these signals that possibly arise during reproduction can be eliminated.

Figure 18:
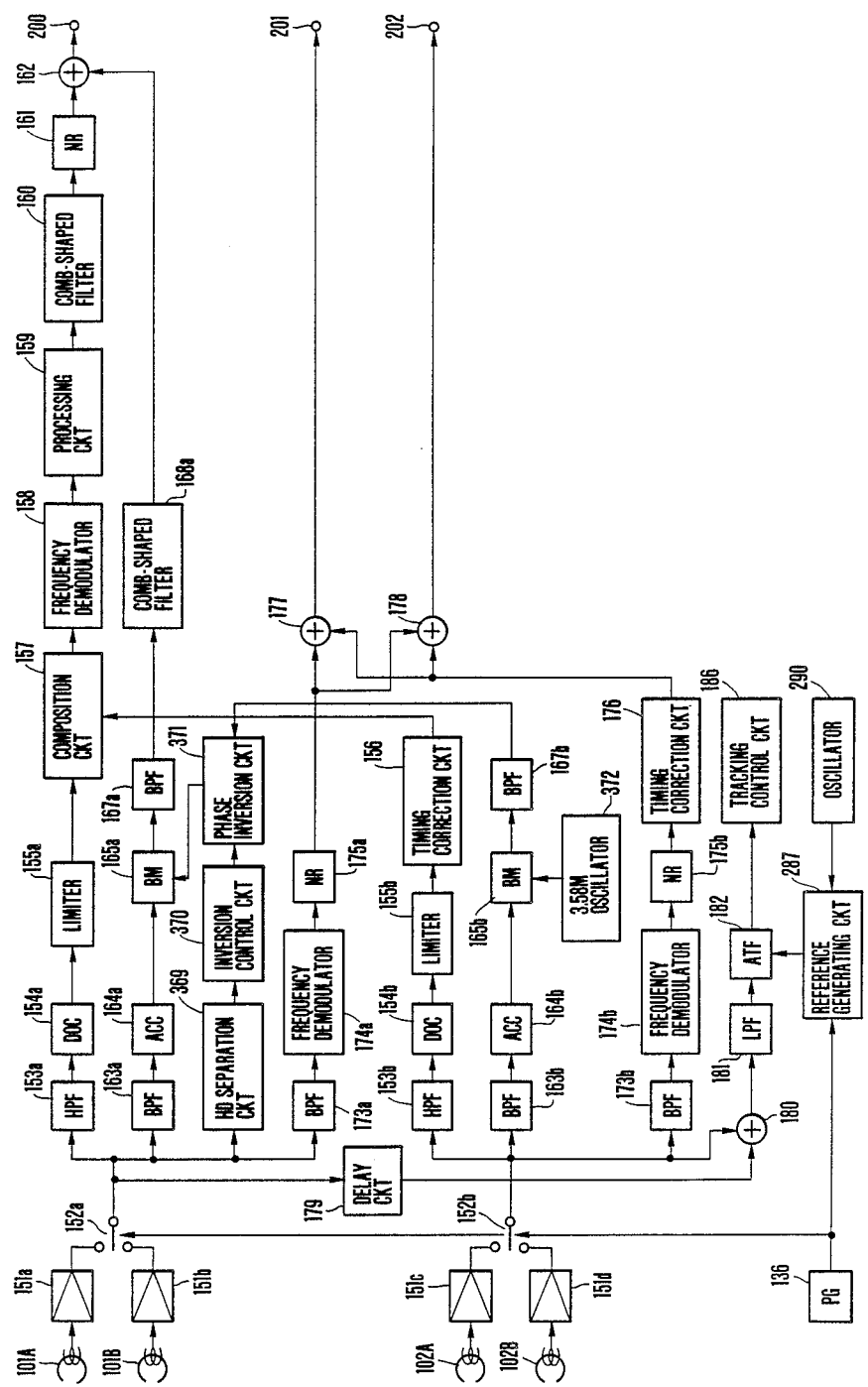
FIG. 18 shows by way of example the arrangement of the reproduction system of the VTR corresponding to the recording system of FIG. 17.

FIG. 18 shows by way of example the arrangement of a reproduction system corresponding to the recording system of FIG. 17. In FIG. 18, parts similar to the parts of FIG. 12 are indicated by the same reference numerals and the details of them are omitted from the following description of this system: The above stated reference signal is separated by a BPF 163b from the output signal of a switch 152b. The reference signal is supplied to an ACC circuit 164b to make its reproduction level unvarying. After that, the reference signal is balance modulated at a BM 165b with the oscillation output of a quartz crystal oscillator 372. The output of the BM 165b is supplied to a BPF 167b to have its component of fSC+fSCL separated there. The BPF 167b thus produces a signal of the frequency fSC+fSCL including a time base fluctuation component which is included in the reproduced signal. This signal is supplied to a phase inversion circuit 371 to be inverted there at every H period in synchronism with the reproduced signal HD produced from an inversion control circuit 370. The circuit 371 thus produces a signal for frequency conversion and supplies it to a BM 165a. Therefore, the frequency converting signal has its frequency shifted as much as $\frac{1}{2}$ fH relative to the frequency fSC+fSCL. The BM 165a then produces a signal of a frequency fSC from which time base changes have been removed. A cross-talk portion of the reference signal leaking from the adjoining track becomes a frequency component shifted $\frac{1}{2}$ fH relative to the frequency fSC and is removed by a comb-shaped filter 168a. A reference pilot signal generating circuit 287 is arranged to generate reference signals of four different kinds (or frequencies) to be used at an ATF circuit 182. A reference numeral 290 denotes a reference oscillator.

The VTR arranged as the embodiment described above is capable of recording a luminance signal of a frequency band which is twice as wide as that of the conventionally recordable luminance signal. Besides, since the luminance signals of the first and second channels are frequency modulated signals of the same band which is the same as that of the original information, they are little affected by time base fluctuations. Meanwhile, the time base fluctuations of the chrominance signal is completely removable by means of the reference signal, the width of its band remains unchanged from the conventional signal. Therefore, a reproduced chrominance signal can be obtained in an adequate state.

Figure 19:
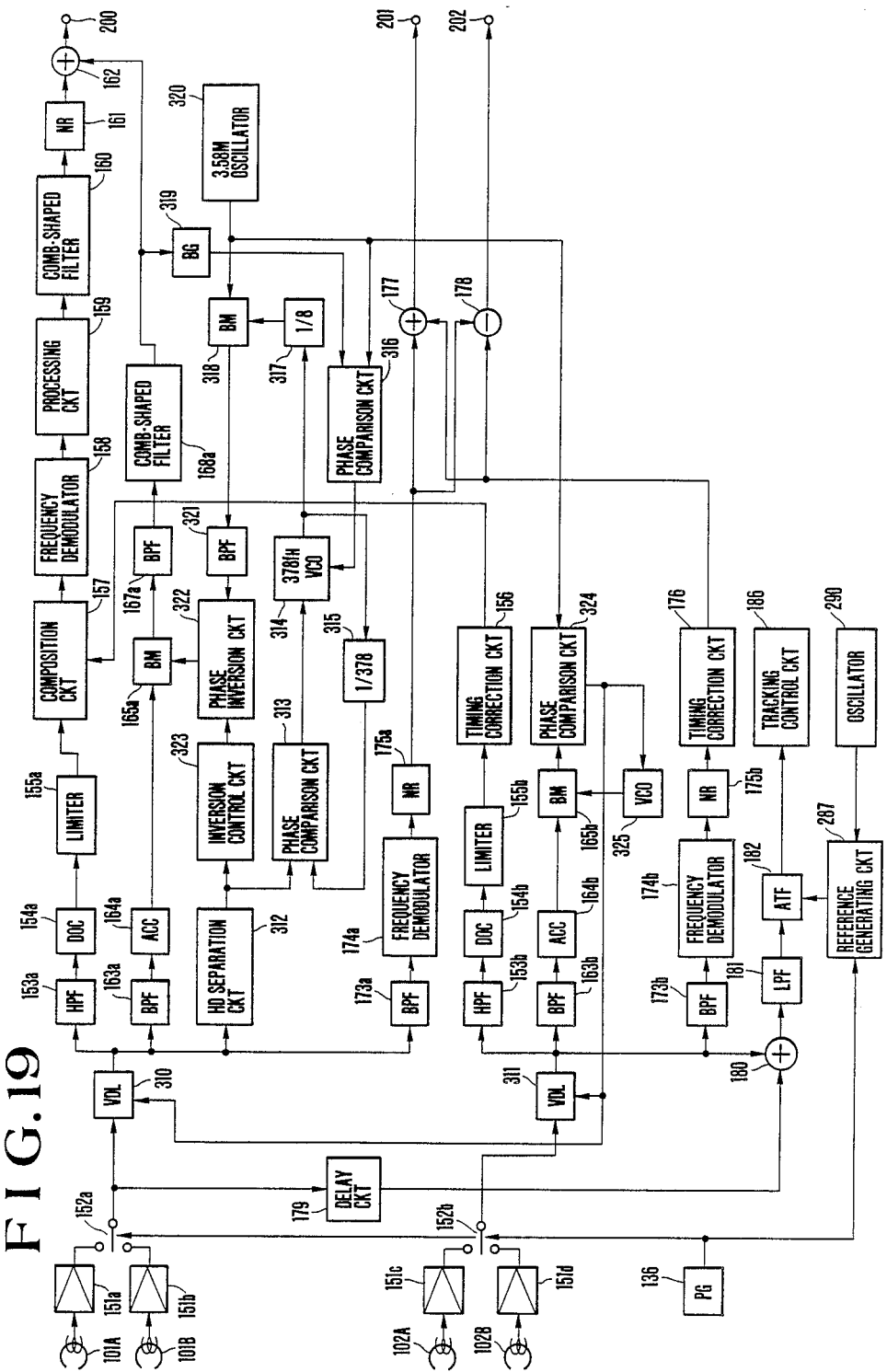
FIG. 19 shows another example of arrangement of the reproduction system corresponding to the recording system of FIG. 17.

Another example of a reproducing system is arranged to be capable of completely removing the time base fluctuations of the luminance signal by effectively utilizing the above stated reference signal which is recorded by the apparatus of FIG. 17. FIG. 19 shows that example of the reproducing system corresponding to the recording system of FIG. 17. The parts similar to those shown in FIG. 18 are indicated by the same reference numerals and the details of them are omitted from the following description:

Referring to FIG. 19, variable delay lines 310 and 311 are connected to the output terminals of switches 152a and 152b for the purpose of correcting the time bases of the signals of the first and second channels.

A reproduced reference signal which is obtained from a BPF 163b is supplied via an ACC circuit 164b to a BM 165b. The output of a VCO 325 having its center frequency at fSC+fSCL is supplied to the BM 165b. The BM 165b then causes the reproduced reference signal to have the frequency of fSC. The output of the BM 165b is then supplied to a phase comparison circuit 324 to be phase compared with the output of a quartz crystal oscillator 320 which is at a frequency of 3.58 MHz. The output of the phase comparison circuit 324 becomes a signal continuously showing time base fluctuations. Therefore, this signal is used for controlling the VCO 325 and also variable delay lines (VDLs) 310 and 311. By this, the time base fluctuations of the first and second channels can be eliminated.

A phase comparison circuit 313 is arranged to perform a phase comparing operation on the signal HD separated by the HD separation circuit 312 and the output of a 1/378 frequency dividing circuit 315. A VCO 314 is arranged to operate at a center frequency of 378 fH under the control of the output of the phase comparison circuit 313. The output of the VCO 314 is supplied to the 1/378 frequency dividing circuit 315. These circuit elements jointly form a known AFC circuit. Meanwhile, a color burst signal included in a chrominance signal produced from a comb-shaped filter 168a is separated by a burst gate (BG) circuit 319. The burst signal thus separated is phase compared by a phase comparison circuit 316 with the output of the above stated oscillator 320. The comparison output of the circuit 316 is also used for controlling the VCO 314. These circuit elements jointly form a known APC circuit.

The output of this VCO 314 is converted into the frequency of fSCL by a $\frac{1}{8}$ frequency divider 317. The output of the frequency divider 317 is balance modulated by a BM 318 with the output of the oscillator 320 and is thus made into a signal of the frequency of fSC+fSCL. This signal is extracted via a BPF 321 and then is inverted at every H period by a phase inversion circuit 322. The output of the circuit 322 is supplied to a BM 165a. The phase inversion circuit 322 operates under the control of an inversion control circuit 323.

The reproduction system of FIG. 19 which is arranged as described above is capable of performing a time base correcting operation also on the reproduced luminance signal. Therefore, compared with the arrangement shown in FIG. 18, the luminance signal is affected by time base fluctuations to a still lesser degree.

Figure 21A:
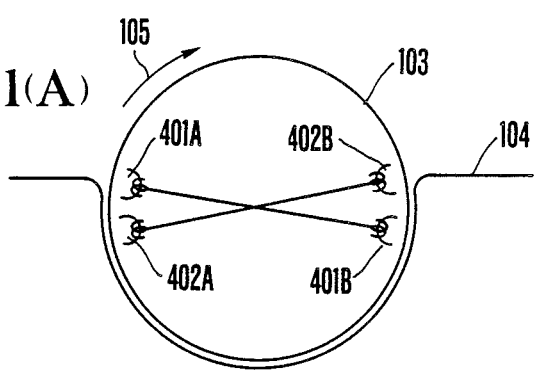
FIGS. 21(A) and 21(B) show the head arrangement of the VTR of FIG. 20.
Figure 21B:
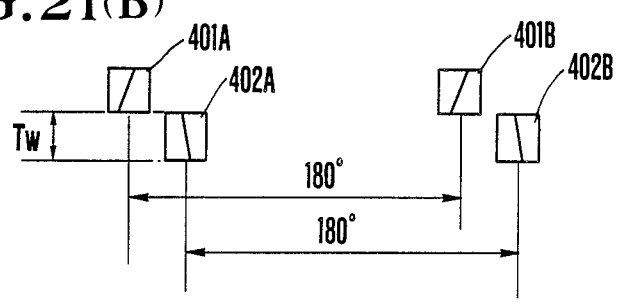
Figure 20:
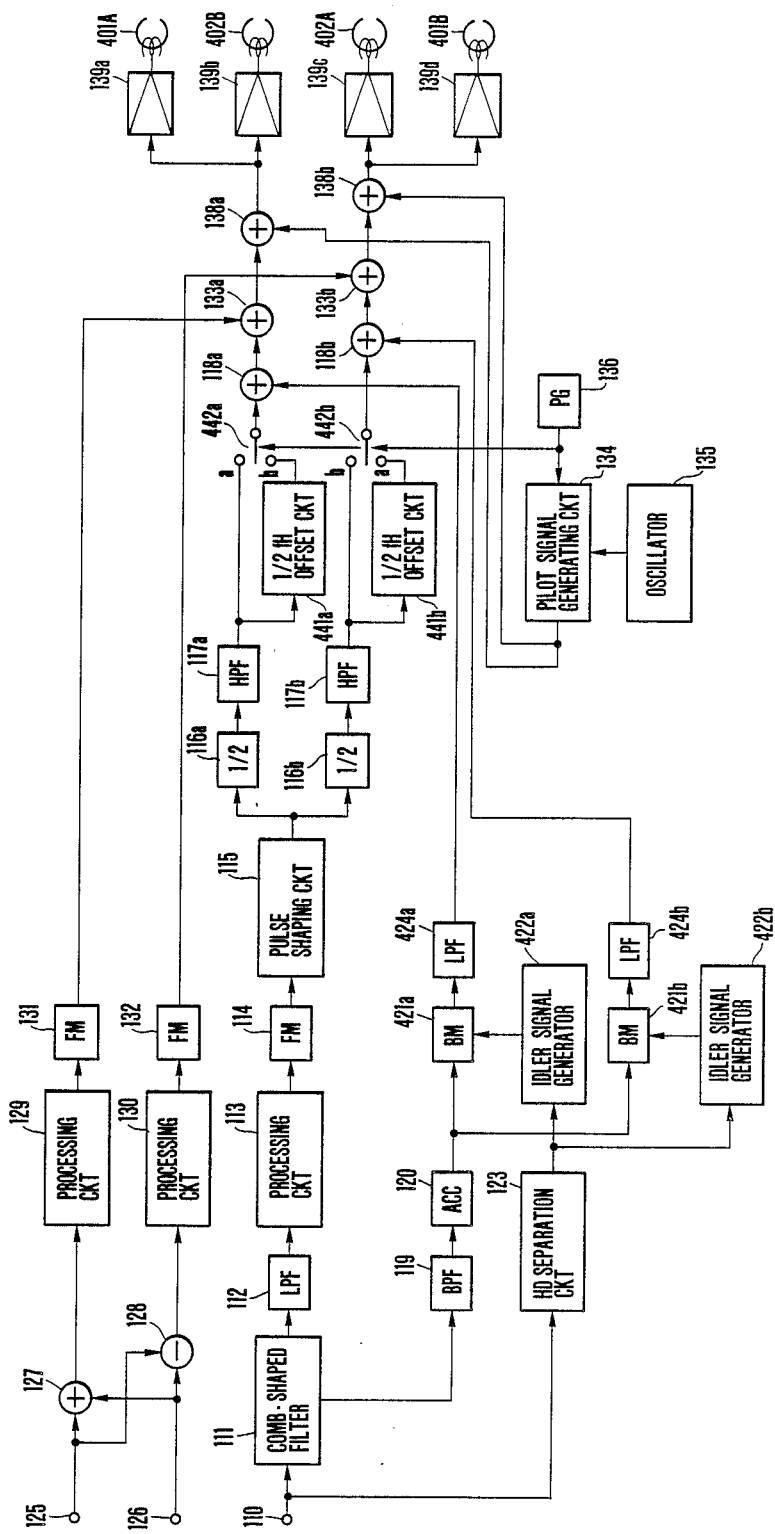
FIG. 20 is a block diagram showing the recording system of a VTR arranged as a further embodiment of this invention.

FIG. 20 shows the arrangement of the recording system of a VTR which is arranged as a further embodiment of this invention. In FIG. 20, components and parts which are similar to those shown in FIG. 7 are indicated by the same reference numerals and the details of them are omitted from the following description. Further, FIGS. 21(A) and 21(B) show the head arrangement of the VTR of FIG. 20. Referring to FIGS. 21(A) and 21(B), heads 401A and 401B are arranged to revolve at 30 rps at a phase difference of 180 degrees and have an azimuth angle of +10°. Other heads 402A and 402B are arranged respectively close to the heads 401A and 401B to revolve at a phase difference of 180 degrees and have an azimuth angle of −10°. These four heads are secured to a rotary cylinder 103. As shown in FIG. 21(A), the rotary cylinder 103 is arranged to have a magnetic tape 104 wrapped round it at least 180 degrees and to rotate in the direction of arrow 105. Further, as shown in FIG. 21(B), the heads 401A and 402A are disposed on the cylinder 103 at a stepped difference Tw from other heads 401B and 402B respectively. This stepped difference Tw approximately coincides with the track pitch.

In the case of this embodiment, the signal of a first channel is recorded by the heads 401A and 402B the signal of a second channel by the heads 402A and 401B.

Figure 22:
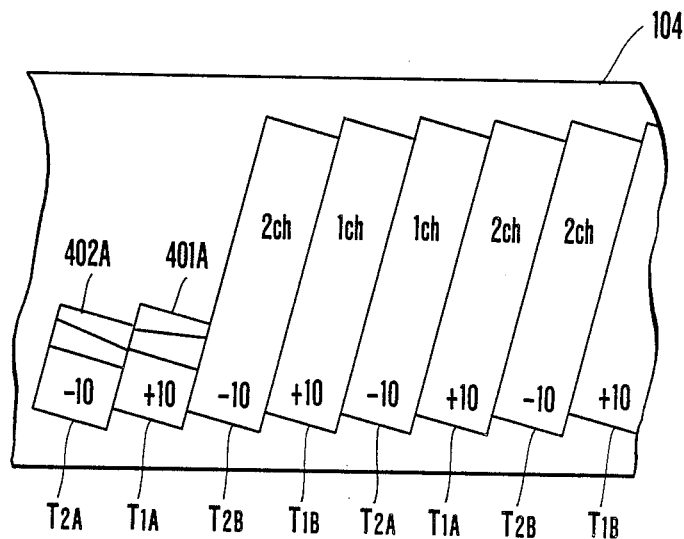
FIG. 22 shows a recording pattern formed on a magnetic tape by the VTR of FIG. 20.

FIG. 22 shows a record pattern obtained on a magnetic tape when a recording operation is performed with the heads shown in FIGS. 22(A) and 21(B). As shown, two recording tracks are simultaneously formed. Tracks T1A and T2B (indicated as "1ch" in the drawing) are formed when the signal of the first channel is recorded while tracks T2A and T1B (indicated as "2ch" in the drawing) are formed when the signal of the second channel is recorded and these tracks are arranged as shown in the drawing. Further, as shown, adjacent tracks are arranged to have opposite azimuth angles without fail for the purpose of preventing crosstalks from adjacent tracks. The magnetic tape 104 is arranged to be caused to travel a distance corresponding to 2 Tw by means of a capstan, etc. which are not shown while each of the heads revolves 180 degrees.

Referring to FIG. 20, $\frac{1}{2}$ fH offset circuits 441a and 441b are arranged to offset the center frequencies of the output signals of HPFs 117a and 117b to an extent of $\frac{1}{2}$ horizontal scanning frequency respectively. Each of the circuits 441a and 441b is composed of, for example, a circuit which inverts the input signal at every horizontal scanning period. Switches 442a and 442b are arranged to selectively produce signals which come via the $\frac{1}{2}$ fH offset circuits 441a and 441b or signals which directly come without passing through these offset circuits. The connecting positions of each of these switches 442a and 442b is on one side "a" thereof when a rectangular wave signal of 30 Hz (hereinafter referred to as signal PG) which is produced by the PG generator 136 and relates to the revolving phase of the heads is at a high level, and is on the other side "b" thereof when the signal PG is at a low level. In other words, the switch 442a is arranged to produce the luminance signal of the first channel which relates to a first field portion of the video signal and comes directly without passing through the offset circuit 441a. The luminance signal of the first channel which is included in a second field portion of the video signal and comes via the offset circuit 441b is produced also by the switch 442a. Meanwhile, the other switch 442b produces the luminance signal of a second channel which is included in the first field portion of the video signal and comes via the offset circuit 441b and also produces the luminance signal of the second channel which is included in the second field portion of the video signal and comes without passing through the offset circuit 441b. The outputs of the switches 442a and 442b are respectively supplied to adders 118a and 118b.

Meanwhile, a chrominance signal which is separated by a comb-shaped filter 111 is supplied to a BPF 119 to have its band limited there. The chrominance signal is then supplied to a known ACC circuit 120 to have its level adjusted there. The level adjusted chrominance signal is supplied to balanced modulators (BMs) 421a and 421b which perform frequency conversion. At each of the BMs 421a and 421b, the carrier frequency of the chrominance signal is converted to a low frequency, say, about 743 KHz on the basis of an idler signal supplied from an idler signal generator 422a or 422b.

These idler signals are arranged, like in the conventional VTR, to have their frequency values determined on the basis of the signal HD which is separated by a horizontal synchronizing signal (HD) separation circuit 123. The frequency of the idler signal from the idler signal generator 422a is set at a value which is $(n+\frac{1}{4})$ fH for the chrominance signal of the first field and $(n-\frac{1}{4})$ fH for the chrominance signal of the second field (n: an integer). The frequency of the idler signal from the idler signal generator 422b is set at a value which is $(n-\frac{1}{4})$ fH for the chrominance signal of the first field and $(n+\frac{1}{4})$ fH for the chrominance signal of the second field. The idler signal of the frequency $(n+\frac{1}{4})$ fH is, for example, inverted and produced at every horizontal scanning period within the first or second field and is produced without inversion for the second or first field. It is also possible to produce an idler signal of a frequency NfH or $(n+\frac{1}{4})$ fH by shifting forward its phase 90 degrees at every horizontal scanning period for the first or second field and by shifting backward the phase 90 degrees at every horizontal scanning period for the second or first field.

Each of LPFs 424a AND 424b is arranged to allow to pass therethrough only a lower side-band component which is included in the output of the BM 421a or 421b and is to be used as a low band converted signal. The outputs of the LPFs 424a and 424b which are thus obtained are supplied to adders 118a and 118b.

Therefore, in the case of this embodiment, the heads 401A and 402B record the signal of the first channel on the magnetic tape 104 and other heads 402A and 401B the signal of the second channel as shown in FIG. 22. Then, following this, pilot signal of four different kinds are recorded in rotation, one for every two tracks.

Figure 23:
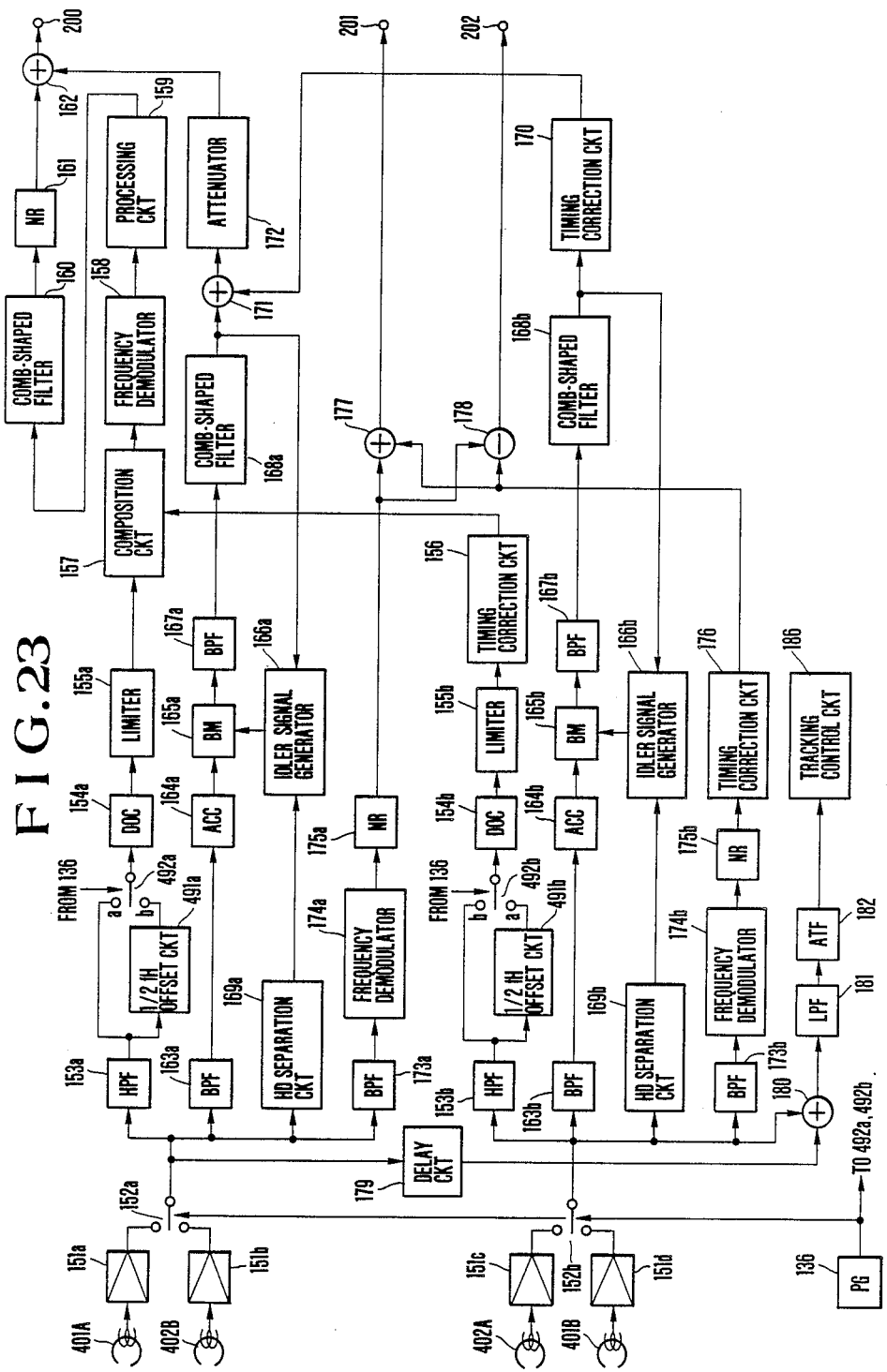
FIG. 23 is a block diagram showing by way of example the reproduction system of the VTR corresponding to the recording system of FIG. 20.

FIG. 23 shows the arrangement of the reproduction system of the VTR of this embodiment. In FIG. 23, parts which are similar to those shown in FIG. 12 are indicated by the same reference numerals. During reproduction, the heads 401A, 401B, 402A and 402B respectively traces tracks T1A, T1B, T2A and T2B. The luminance signal of the first channel is separated by an HPF 153a. Since the center frequency of the luminance signal of the first channel within the second field portion thereof is offset as much as $\frac{1}{2}$ fH, the center frequency of the luminance signal is adjusted to be constant by taking out the second field portion alone from a $\frac{1}{2}$ fH offset circuit 491a by means of a switch 492a which operates under the control of the signal PG. The luminance signal of the second channel which is separated by an HPF 153b is likewise processed to make its center frequency constant through a $\frac{1}{2}$ fH offset circuit 491b and a switch 492b.

Since the carrier frequency of a chrominance signal reproduced is switched over between frequencies $(m+\frac{1}{4})$ fH and $(m-\frac{1}{4})$ (m: an integer) for every field, an idler signal generator 166a is provided for the purpose of bringing the carrier frequency back to its original frequency. Therefore, the idler signal generator 166a is arranged, like the idler signal generator 122a of the recording system, to produce an idler signal at a frequency of $(n+\frac{1}{4})$ fH for the low-band converted chrominance signal of the first field and at a frequency of $(n-\frac{1}{4})$ fH for the low-band converted chrominance signal of the second field. As a result, each of the chrominance signal reproduced from adjacent tracks has a frequency component (about an integer times as high as fH) differing $\frac{1}{2}$ fH from the color subcarrier frequency. This is, therefore, removed by means of a comb-shaped filter 168a.

Meanwhile, a chrominance signal which is separated by a BPF 163b from the output signal of the switch 152b is likewise processed to have jitter and noise removed by a comb-shaped filter 168b.

If a signal is arranged to be recorded by the VTR of the embodiment described above at a track pitch which is $\frac{1}{2}$ of the track pitch of the conventional two-head helical scanning type VTR, the recorded signal can be reproduced in a narrow band state by the conventional VTR. For example, some of the conventional VTRs are arranged to form a recording track pattern having different azimuth angles between adjacent tracks; to have the center frequency of a frequency modulated luminance signal offset $\frac{1}{2}$ fH; and to have the carrier frequency of a low-band converted chrominance signal also offset as much as ½ fH. The signals recorded by the conventional VTR of this type are in exactly the same form as the signals recorded by the heads 401A and 402B. Further, as long as the conventional VTR is arranged to perform tracking control by the four-frequency method, its head for reproducing the first field portion of a recorded signal traces the tracks T1A and T2A of FIG. 22 by straddling them and its head for the second field the tracks T2B and T1B. Thus, reproduced signals are obtainable from the tracks T1A and T2B by means of these heads.

Figure 25:
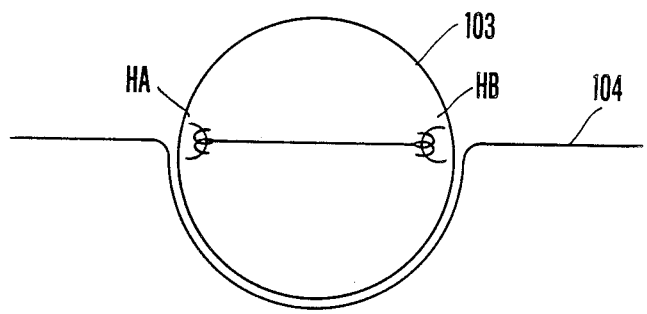
FIG. 25 shows the head arrangement of the VTR of FIG. 24.
Figure 24:
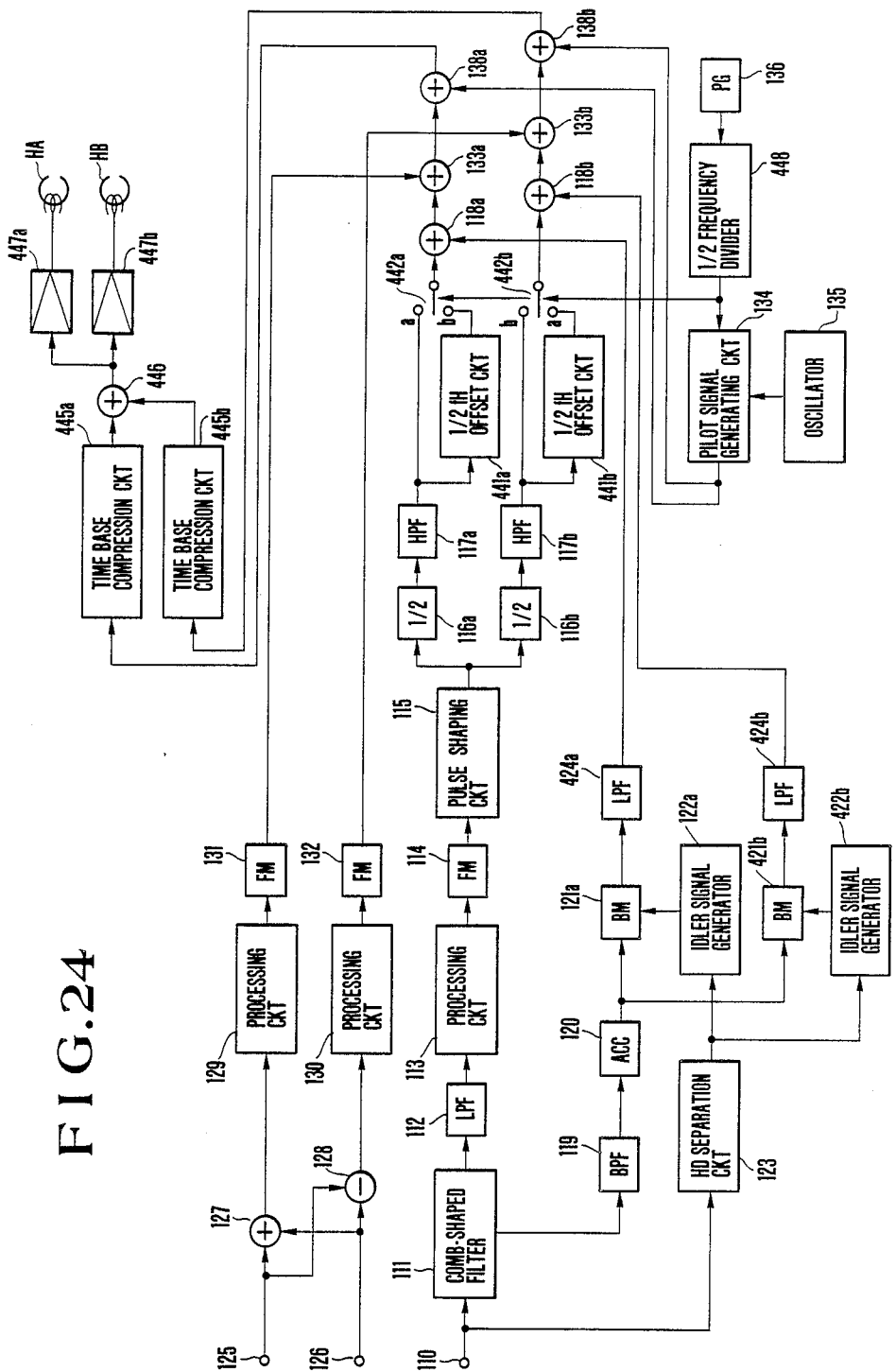
FIG. 24 is a block diagram showing the recording system of a VTR arranged as a still further embodiment of this invention.

FIG. 24 shows in a block diagram the recording system of a VTR arranged as a furthe embodiment of this invention. FIG. 25 shows the head arrangement of the same VTR. The VTR of this embodiment is arranged to record signals by two heads, instead of four heads, in a recording pattern similar to the recording pattern of the VTR of FIG. 20. In FIG. 24, parts similar to those shown in FIG. 20 are indicated by the same reference numerals and the details of them are omitted from the following description:

Adders 138a and 138b are arranged, like in the case of FIG. 20, to produce in parallel the video signals of first and second channels. Time base compression circuits 145a and 145b are provided with field memory devices respectively. A clock signal for writing into the memory is arranged to be of a frequency ½ of that of a clock signal for reading. The time base compression circuits 445a is arranged to produce the first field video signal 1/120 sec earlier than the circuit 445b. The other time base compression circuit 445b is arranged to produce the second field video signal 1/120 sec earlier than the circuit 445a. The outputs of the circuits 445a and 445b are multiplexed by an adder 446 in a time sharing manner and are thus made into a continuous signal.

This continuous signal consists of portions which are aligned in the order of a first field portion of the first channel video signal, a first field portion of the second channel video signal, a second field portion of the second channel video signal and a second field portion of the first channel video signal. These video signal portions change from one over to another every 1/120 sec. The video signal thus obtained is recorded by heads HA and HB via amplifiers 447a and 447b. The heads HA and HB are arranged to form one track in 1/120 sec. Therefore, a recording pattern thus obtained on a magnetic recording tape 104 is exactly the same as the pattern of FIG. 22 with the exception of some difference in inclination. A PG generator 136 is arranged to produce a rectangular wave signal of 60 Hz. This signal is supplied to a ½ frequency divider 448 to be changed into a signal PG of 30 Hz. The signal PG is supplied to each applicable signal processing system.

For reproducing the wide-band video signal recorded in the above stated recording pattern, the two-head type VTR of this embodiment is provided with a reproduction system which are arranged as shown in FIG. 26, in which: Parts similar to those shown in FIG. 23 are indicated by the same reference numerals. Signals reproduced by the heads HA and HB are supplied via reproduction amplifiers 495a and 495b to a switch 496. The switch 496 is arranged to be controlled by the rectangular wave signal of 60 Hz produced from the PG generator 136 and to produce a continuous signal which consists of the above stated time-base multiplexed video signal of the two channels. This signal is supplied to time base expanders 497a and 497b. The time base expander 497a is arranged to time base expand the first channel video signal. The other time base expander 497b time base expands the second channel video signal. These expanders respectively produce time-base expanded continuous signal. The ensuing processing operation is similar to the operation performed in the case of FIG. 23. The writing timing of the time base expanders are as follows: For the first field, the writing timing of the expander 497a is 1/120 sec earlier. For the second field, that of the other expander 497b is 1/120 sec earlier.

The VTR which is arranged as described above is also capable of recording a wide-band video signal like the VTR shown in FIGS. 20 to 23 and the signal recorded by the VTR is reproducible by the conventional VTR. However, in case where the record is to be reproduced by the conventional VTR, the tracing locus of the head is not parallel to the center line of the recording track. Therefore, the ATF signal, in that instance, is sampled and held in the middle part of each field.

Further, a signal recorded on a magnetic tape by the recording system of FIG. 20 is reproducible by the reproduction system of FIG. 26; and a signal recorded on a magnetic tape by the recording system of FIG. 24 is reproducible by the reproduction system shown in FIG. 23.

What is claimed is:

1. A video signal recording apparatus, comprising:
  (a) separating means for separating a luminance signal and a carrier chrominance signal from an incoming video signal;
  (b) modulating means for angle modulating said luminance signal separated by said separating means;
  (c) channel dividing means arranged to form first and second recording luminance signals by frequency dividing at different phases the angle modulated luminance signal modulated by said modulating means;
  (d) converting means for converting the carrier wave of said carrier chrominance signal separated by said separating means to the low band of said first and second recording luminance signals;
  (e) multiplexing means arranged to form first and second recording signals by multiplexing said low band converted carrier chrominance signal converted by said converting means with at least one of said first and second recording luminance signals; and
  (f) recording means for recording said first and second recording signals simultaneously on a recording medium.

2. An apparatus according to claim 1, wherein said recording means includes first and second rotary heads which have different azimuth angles and are arranged to record said first and second recording signals while forming adjacent tracks.

3. An apparatus according to claim 2, wherein said recording means further includes third and fourth rotary heads which are arranged to trace said recording medium at a timing different from the timing of said first and second rotary heads and to record said first and second recording signals in adjacent tracks forming said tracks on said recording medium.

4. An apparatus according to claim 3, wherein said first, second, third and fourth rotary heads have different azimuth angles from each other.

5. An apparatus according to claim 3, wherein first, second, third and fourth tracks which are formed by said first, second, third and fourth rotary heads are arranged in the order of the first track, the second track, the fourth track and the third track.

6. An apparatus according to claim 5, wherein said first and fourth rotary heads have the same azimuth angle while said second and third rotary heads have the same azimuth angle.

7. An apparatus according to claim 5, further comprising offsetting means for frequency offsetting the recording luminance signal to be recorded by said first and fourth rotary head and the recording luminance signal to be recorded by said second and third rotary heads to an extent which is an odd number times as much as the horizontal scanning frequency of said video signal.

8. An apparatus according to claim 5, wherein said multiplexing means is arranged to multiplex said low band converted carrier chrominance signal with both said first and second recording luminance signals to be recorded.

9. An apparatus according to claim 8, further comprising offsetting means for frequency offsetting the carrier chrominance signal to be recorded by said first and fourth rotary heads and the carrier chrominance signal to be recorded by said second and third rotary heads to an extent which is an odd number times as much as the horizontal scanning frequency of said video signal.

10. An apparatus according to claim 1, wherein said multiplexing means is arranged to multiplex said low band converted carrier chrominance signal with both said first and second luminance signals to be recorded.

11. An apparatus according to claim 1, wherein said multiplexing means is arranged to multiplex said low bland converted carrier chrominance signal only with said first luminance signal to be recorded.

12. An apparatus according to claim 11, further comprising reference signal multiplexing means for multiplexing a reference signal of a frequency related to the frequency of the carrier wave of said low band converted carrier chrominance signal with said second luminance signal to be recorded.

13. An apparatus according to claim 12, further comprising:
reproducing means for reproducing said first and second recording signals simultaneously from said recording medium;
means for separating said low band converted carrier chrominance signal from the first recording signal reproduced by said reproducing means; and
means for separating said reference signal from the second reording signal reproduced by said reproducing means.

14. An apparatus according to claim 13, further comprising time base correcting means for correcting, on the basis of said reference signal separated from said second recording signal, the time base of said low band converted carrier chrominance signal separated from said first recording signal.

15. An apparatus according to claim 13, further comprising timing control means for controlling, on the basis of said reference signal separated from said second recording signal, the relative timing of said first and second recording signals reproduced by said reproducing means.

16. A video signal recording apparatus, comprising:
(a) separating means for separating a luminance signal from an incoming video signal;
(b) modulating means for angle modulating said luminance signal separated by said separating means;
(c) channel dividing means arranged to form first and second recording luminance signals by frequency dividing at different phases said angle modulated luminance signal modulated by said modulating means;
(d) recording audio signal forming means for forming first and second recording audio signals on the basis of an incoming stereo audio signal;
(e) multiplexing means arranged to form first and second recording signals by multiplexing said first and second recording audio signals respectively with said first and second recording luminance signals; and
(f) recording means for recording said first and second recording signals simultaneously on a recording medium.

17. An apparatus according to claim 16, wherein said audio signal forming means includes angle modulating means for angle modulating a pair of signals related to said stereo audio signal.

18. An apparatus according to claim 16, wherein said audio signal forming means includes means for computing the sum of the L and R channels of said stereo audio signaland means for computing a difference between said L and R channels.

19. An apparatus according to claim 16, wherein said recording means includes first and second rotary heads which have different azimuth angles from each other and are arranged to record said first and second recording signals in adjacent tracks forming said tracks on said recording medium.

20. An apparatus according to claim 19, wherein said recording means further includes third and fourth rotary heads which are arranged to trace said recording medium at different timing from said first and second rotary heads and to record said first and second recording signals in adjacent tracks forming said tracks on said recording medium.

21. An information signal recording apparatus, comprising:
(a) modulating means for angle modulating an incoming information signal;
(b) channel dividing means arranged to form first and second recording signals by dividing, at different phases, the angle modulated signal which is modulated by said modulating means; and
(c) recording means for recording said first and second recording signals, said recording means being arranged to record said first recording signal in a first track and said second recording signal in a second track while forming said first and second tracks at different azimuth angles and to record said first recording signal in a fourth track and said second recording signal in a third track while forming said third track which has the same azimuth angle as said first track adjacently to said second track and said fourth track which has the same azimuth angle as said second track adjacently to said third track.

22. An apparatus according to claim 21, wherein said recording means includes first and second rotary heads which are arranged to have different azimuth angles and to record said first and second recording signals while forming adjacent tracks on said recording medium; and third and fourth rotary heads which are arranged to have the same azimuth angles as those of said first and second rotary heads respectively, to trace said recording medium at different timing from said first and second rotary heads and to record said first and second recording signals in adjacent tracks forming said tracks on said recording medium.

23. An apparatus according to claim 21, wherein said first and second recording signals respectively include first and second luminance signals; and said first and second luminance signals are offset to an extent of frequency which is an odd number times as much as $\frac{1}{2}$ of the horizontal scanning frequency of said first and second luminance signals.

24. An apparatus according to claim 22, wherein said first and second recording signals further include first and second carrier chrominance signals respectively; and said first and second carrier chrominance signals are offset to an extent of frequency which is an odd number times as much as $\frac{1}{2}$ of the horizontal scanning frequency of said first and second luminance signals.

25. An apparatus for reproducing an angle modulated information signal from a recording medium on which first and second recording signals are recorded including first and second pulse signals obtained by frequency dividing said information signal at different phases, comprising:
 (a) reproducing means for simultaneously reproducing said first and second recording signals;
 (b) composing means for obtaining a composite pulse signal by composing said first and second pulse signals reproduced by said reproducing means;
 (c) detecting means for detecting the duty of at least a part of said composite pulse signal;
 (d) correcting means for correcting the relative timing of said first and second pulse signals on the basis of the duty detected by said detecting means; and
 (e) restoring means for restoring said information signal by angle demodulating said composite pulse signal.

26. An apparatus according to claim 25, wherein said information signal includes a video signal; and said detecting means includes separating means for separating a horizontal synchronizng signal from the video signal restored by said restoring means and means for detecting the duty of said composite pulse signal obtained at the timing determined on the basis of the horizontal synchronizing signal separated by the separating means.

27. An apparatus for reproducing an angle modulated information signal from a recording medium on which first and second recording signals respectively including first and second pulse signals obtained by frequency dividing said information signal at different phases are recorded in adjacent pair of tracks of different azimuth angles, comprising:
 (a) a pair of heads which have different azimuth angles and are arranged to simultaneously reproduce said first and second recording signals;
 (b) composing means for obtaining a composite pulse signal by composing said first and second pulse signals reproduced by said pair of heads;
 (c) tracking error signal forming means for forming a tracking error signal indicative of the tracking error of said pair of heads for said adjacent pair of tracks;
 (d) timing correcting means for correcting, on the basis of said tracking error signal formed by said forming means, the relative timing of said first and second pulse signals; and
 (e) restoring means for restoring said information signal by angle demodulating said composite pulse signal.

28. An apparatus according to claim 27, wherein said first and second recording signals respectively include pilot signals to be used for tracking control; and said tracking error signal forming means is arranged to form said tracking error signal by using said pilot signals reproduced by said pair of heads.

* * * * *